Jan. 11, 1966 J. J. FANNON, JR 3,228,113
HEATING APPARATUS AND METHOD
Filed Aug. 18, 1960 18 Sheets-Sheet 3
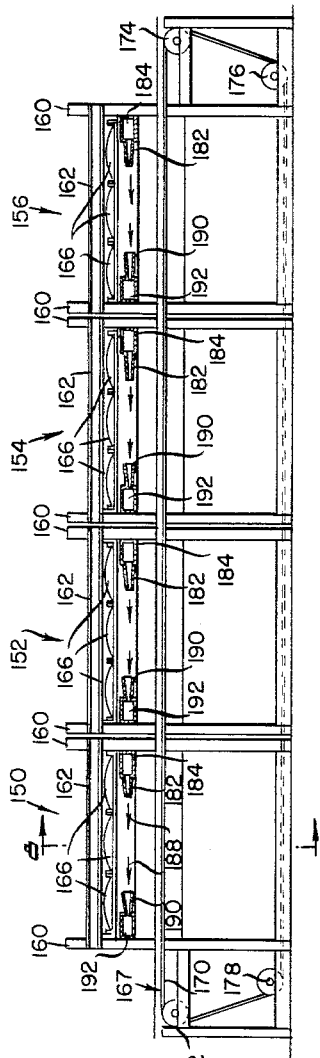
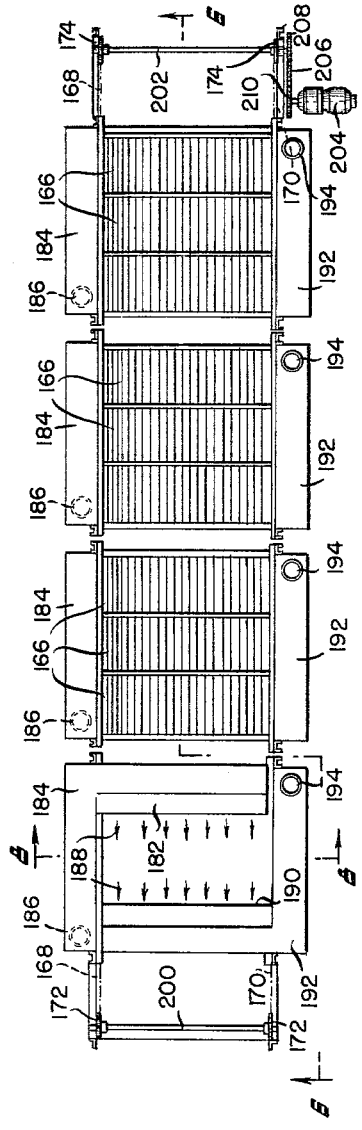
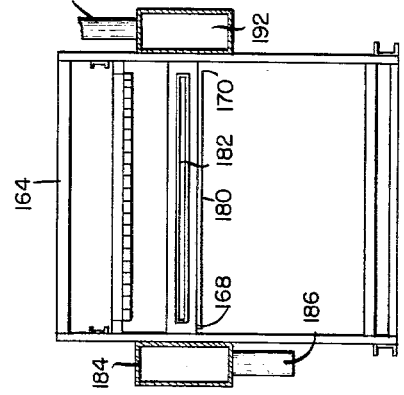
INVENTOR
John J. Fannon, Jr.
BY
ATTORNEYS

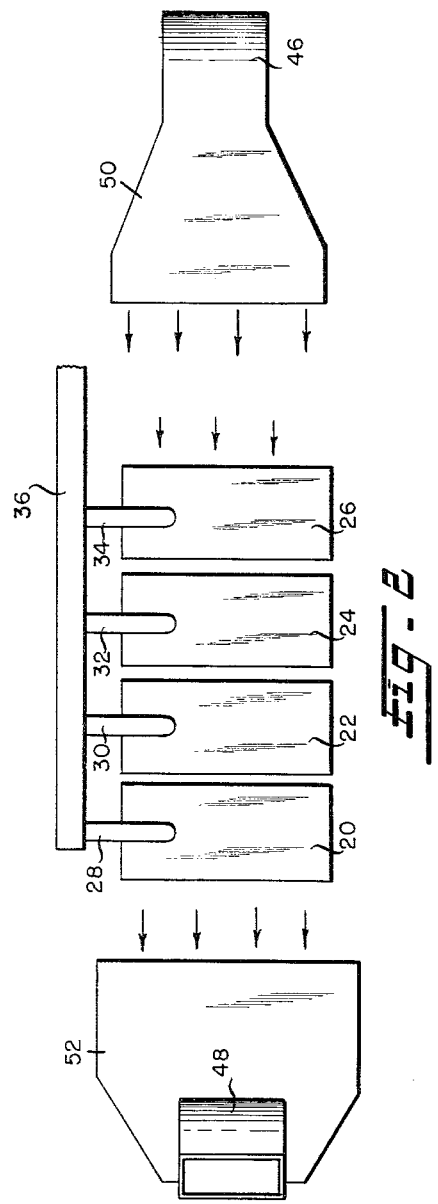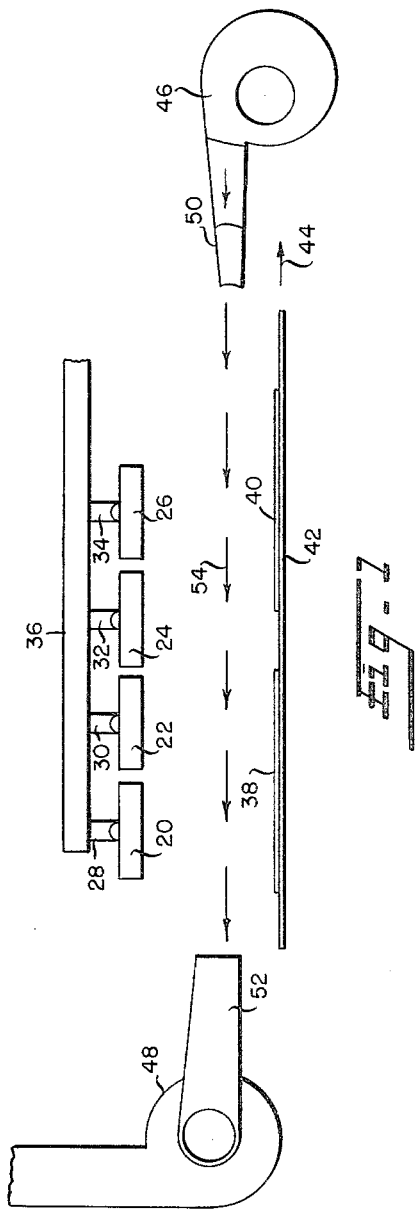

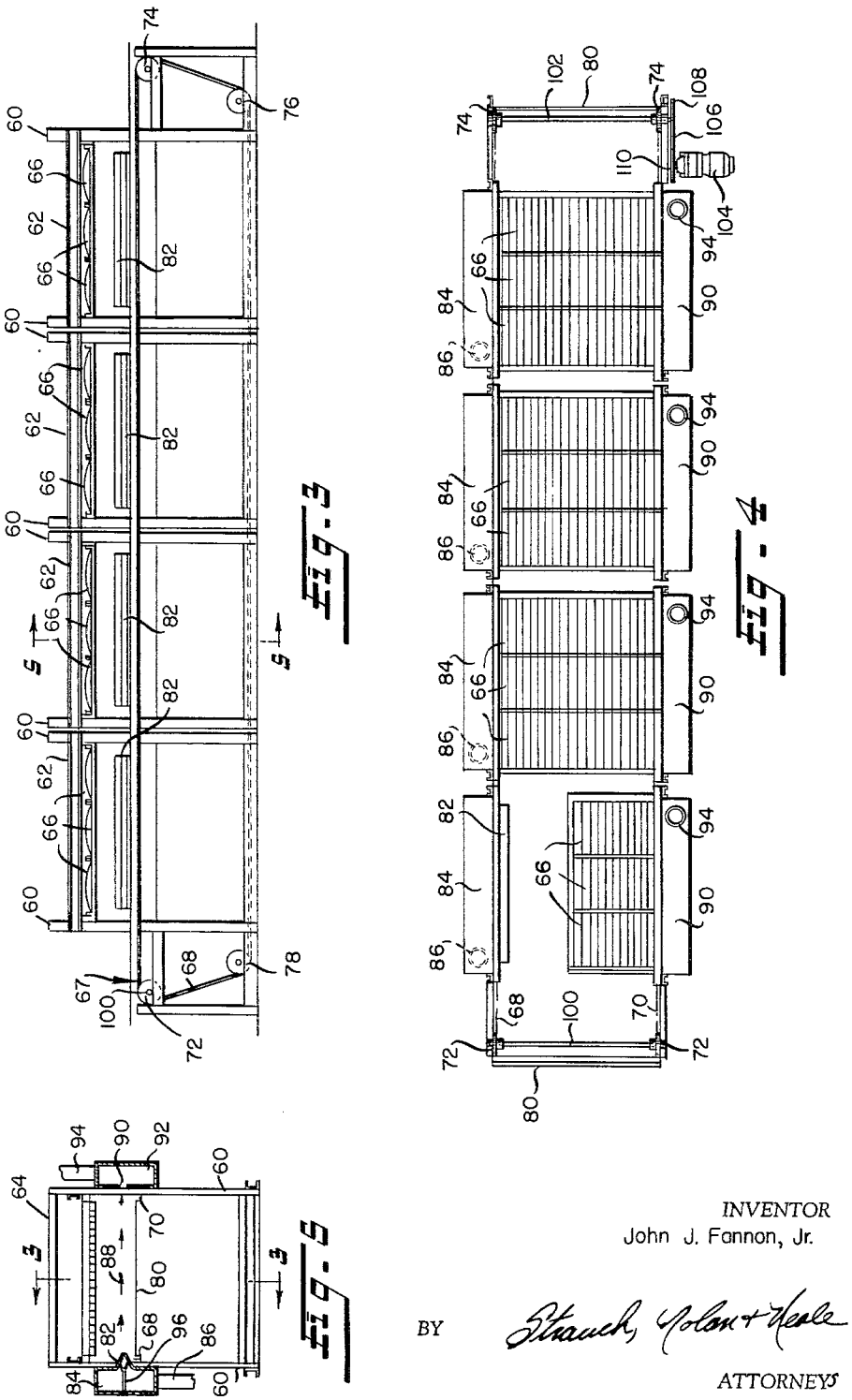

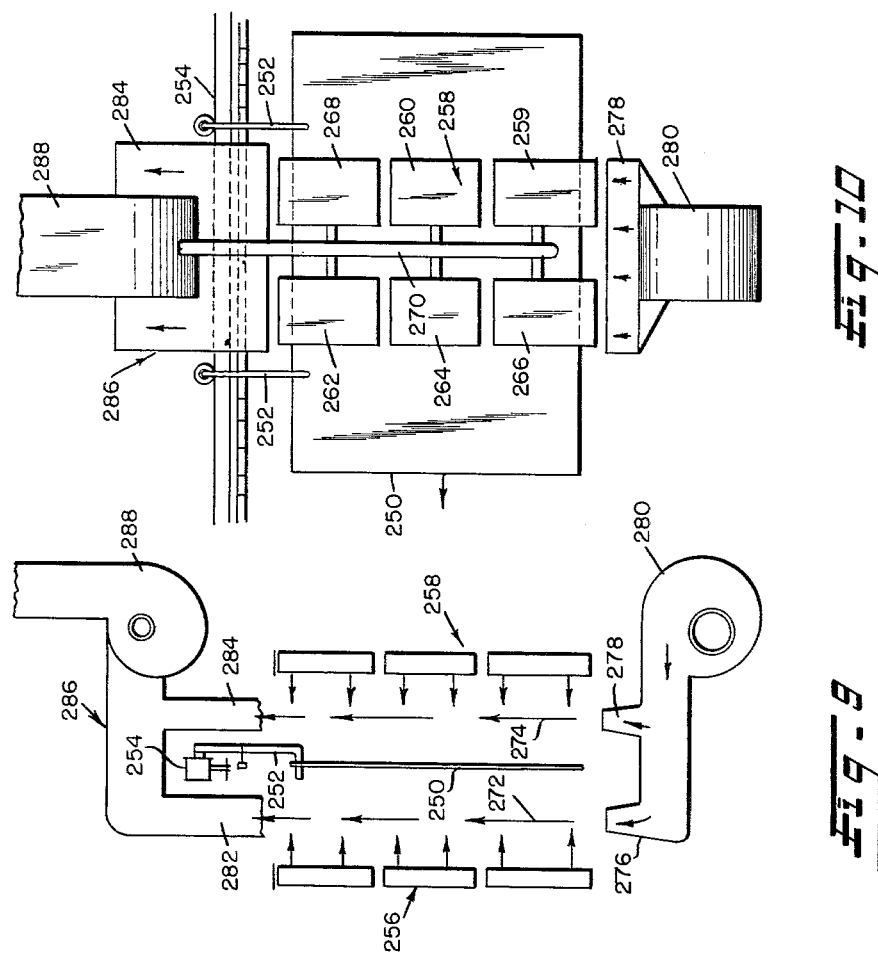

Jan. 11, 1966 J. J. FANNON, JR 3,228,113
HEATING APPARATUS AND METHOD
Filed Aug. 18, 1960 18 Sheets-Sheet 5

INVENTOR
John J. Fannon, Jr.
ATTORNEYS

INVENTOR
John J. Fannon, Jr

Jan. 11, 1966  J. J. FANNON, JR  3,228,113
HEATING APPARATUS AND METHOD
Filed Aug. 18, 1960  18 Sheets-Sheet 9

INVENTOR
John J. Fannon, Jr.

BY *Strauch, Nolan & Neale*

ATTORNEYS

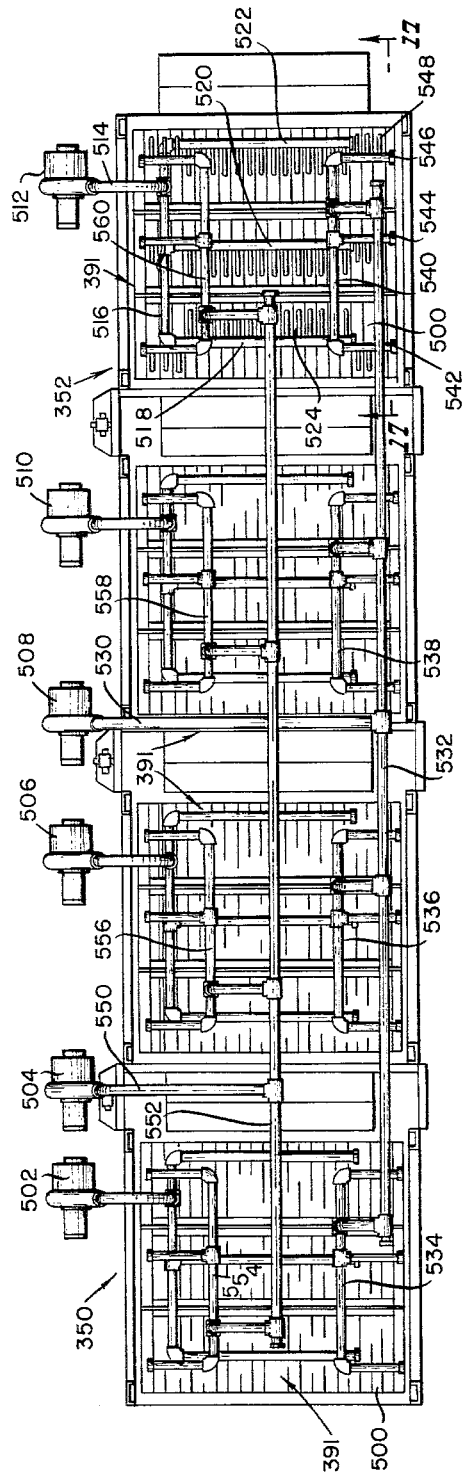

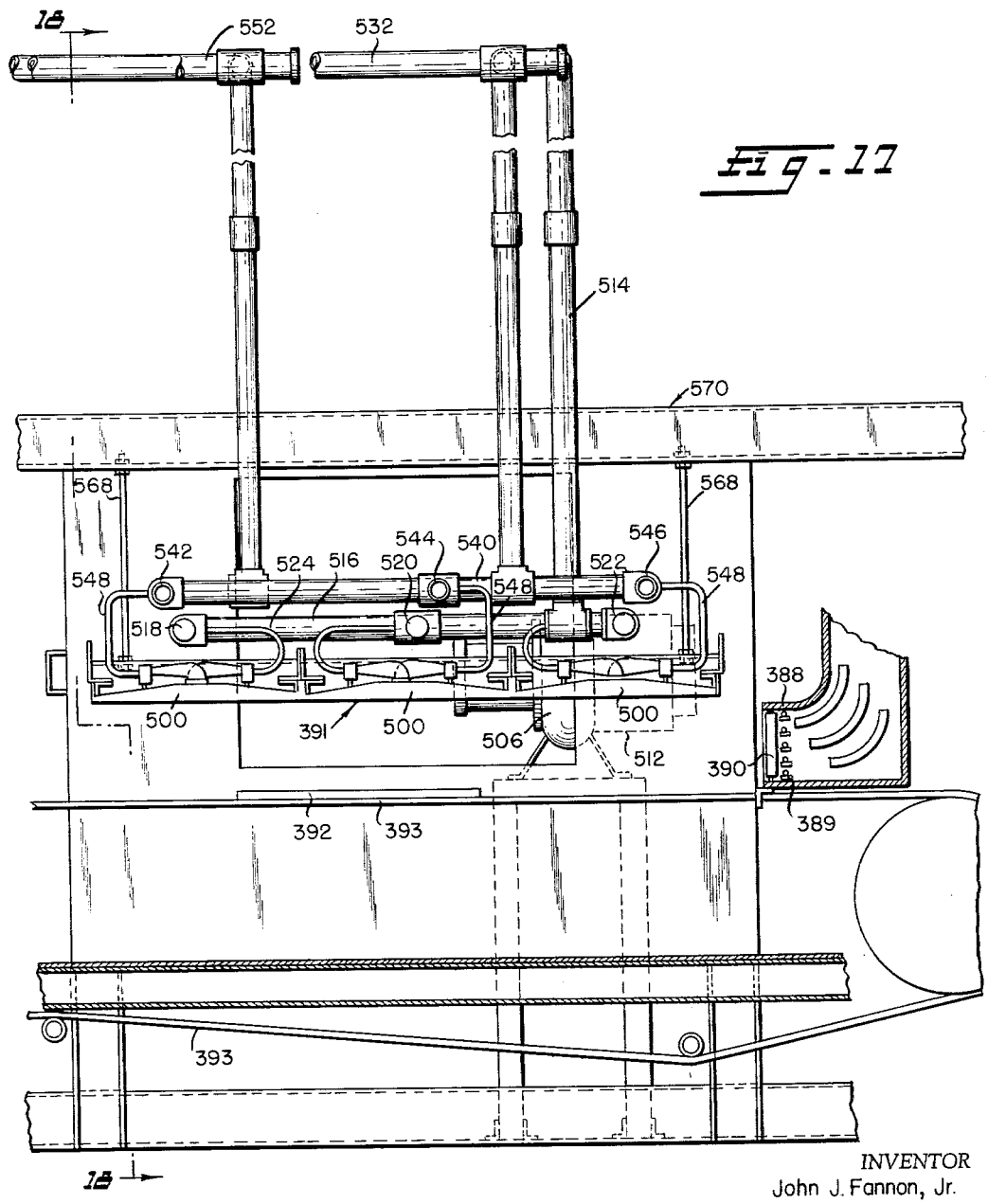

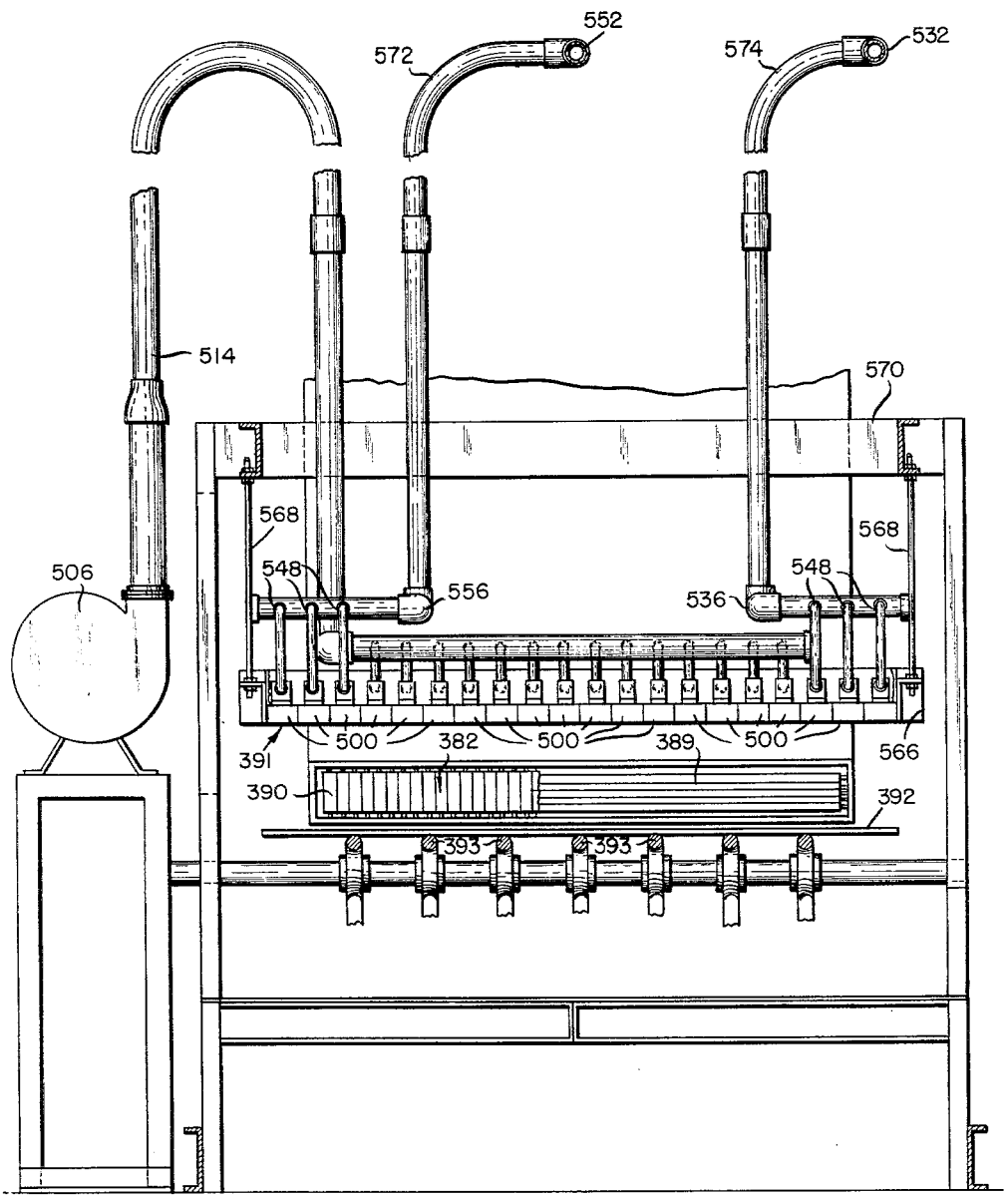

Jan. 11, 1966   J. J. FANNON, JR   3,228,113
HEATING APPARATUS AND METHOD
Filed Aug. 18, 1960   18 Sheets-Sheet 13
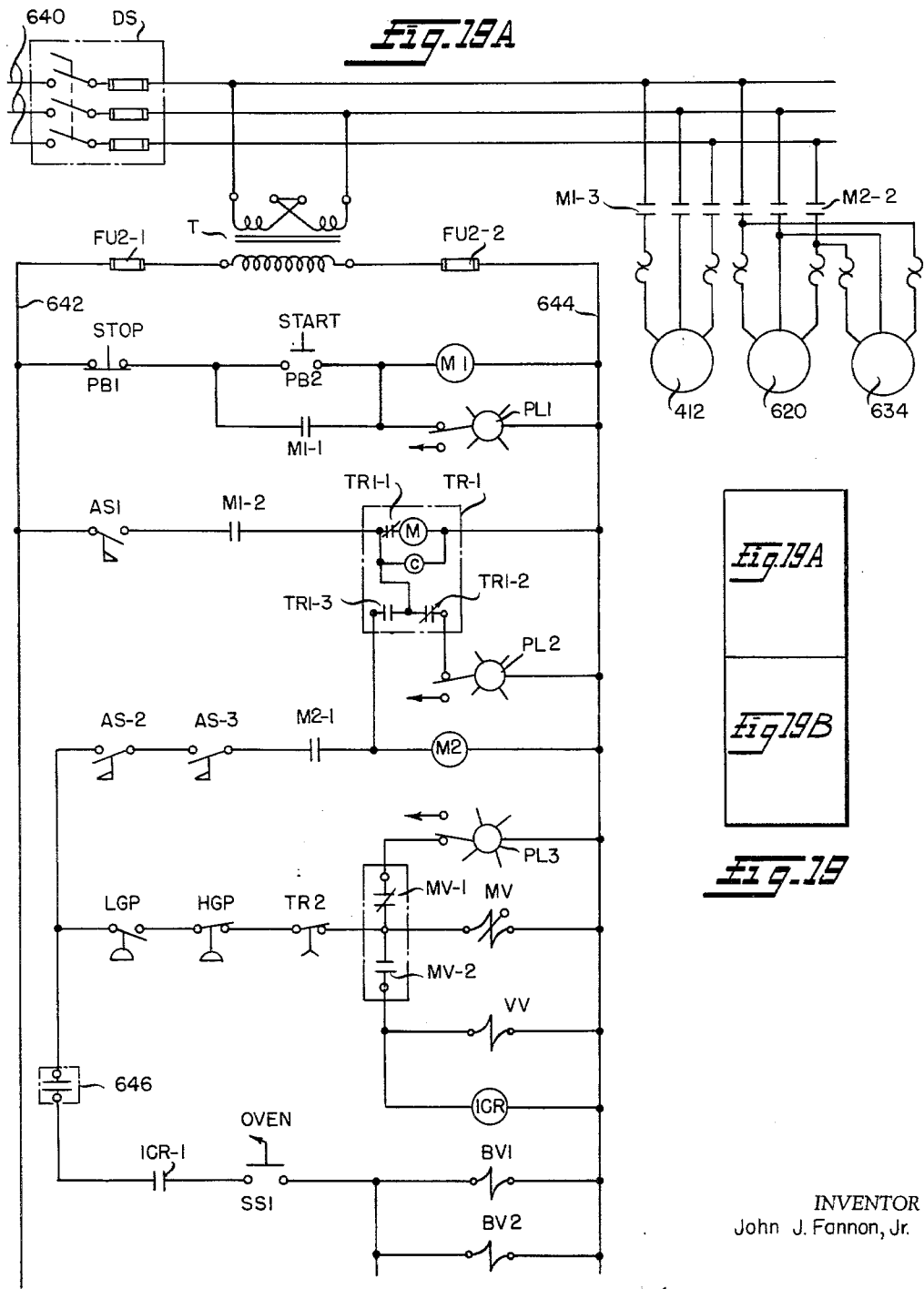
INVENTOR
John J. Fannon, Jr.
BY *Strauch, Nolan & Neale*
ATTORNEYS

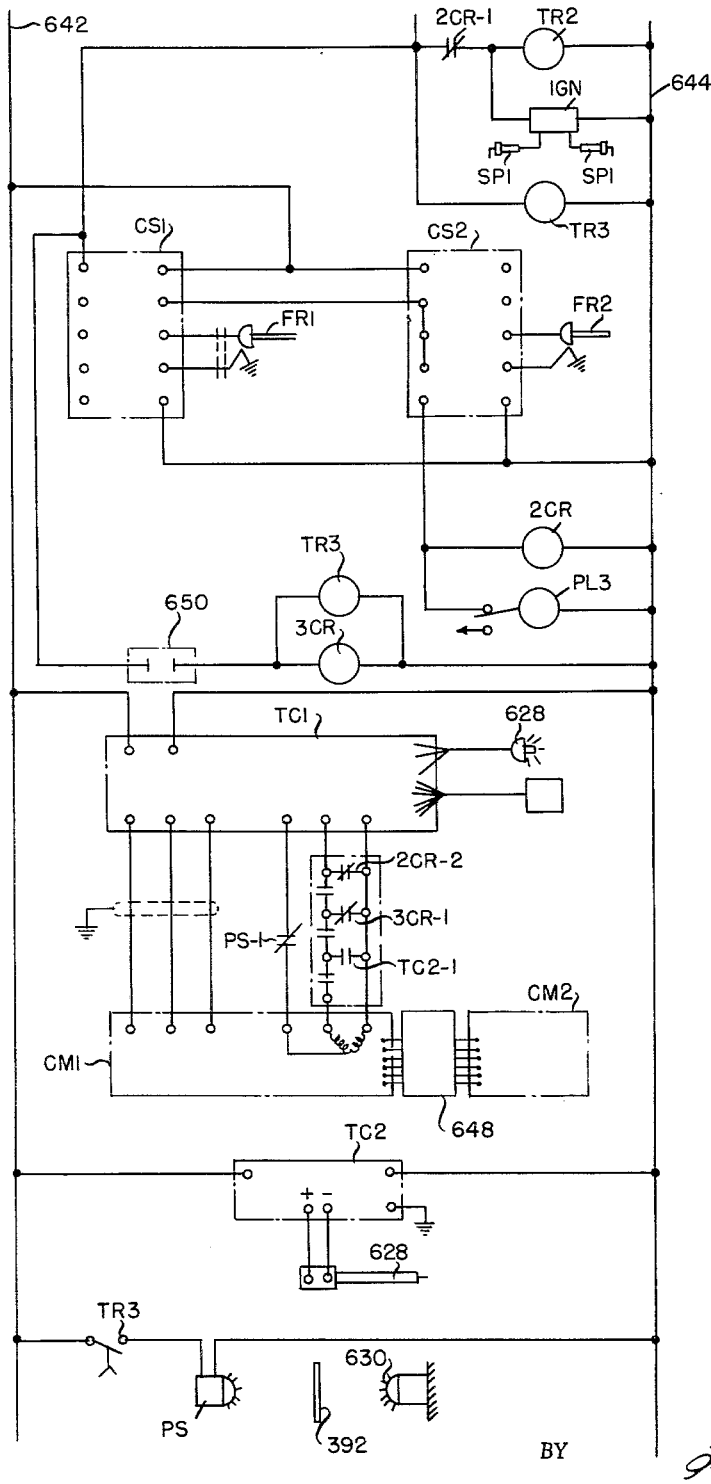

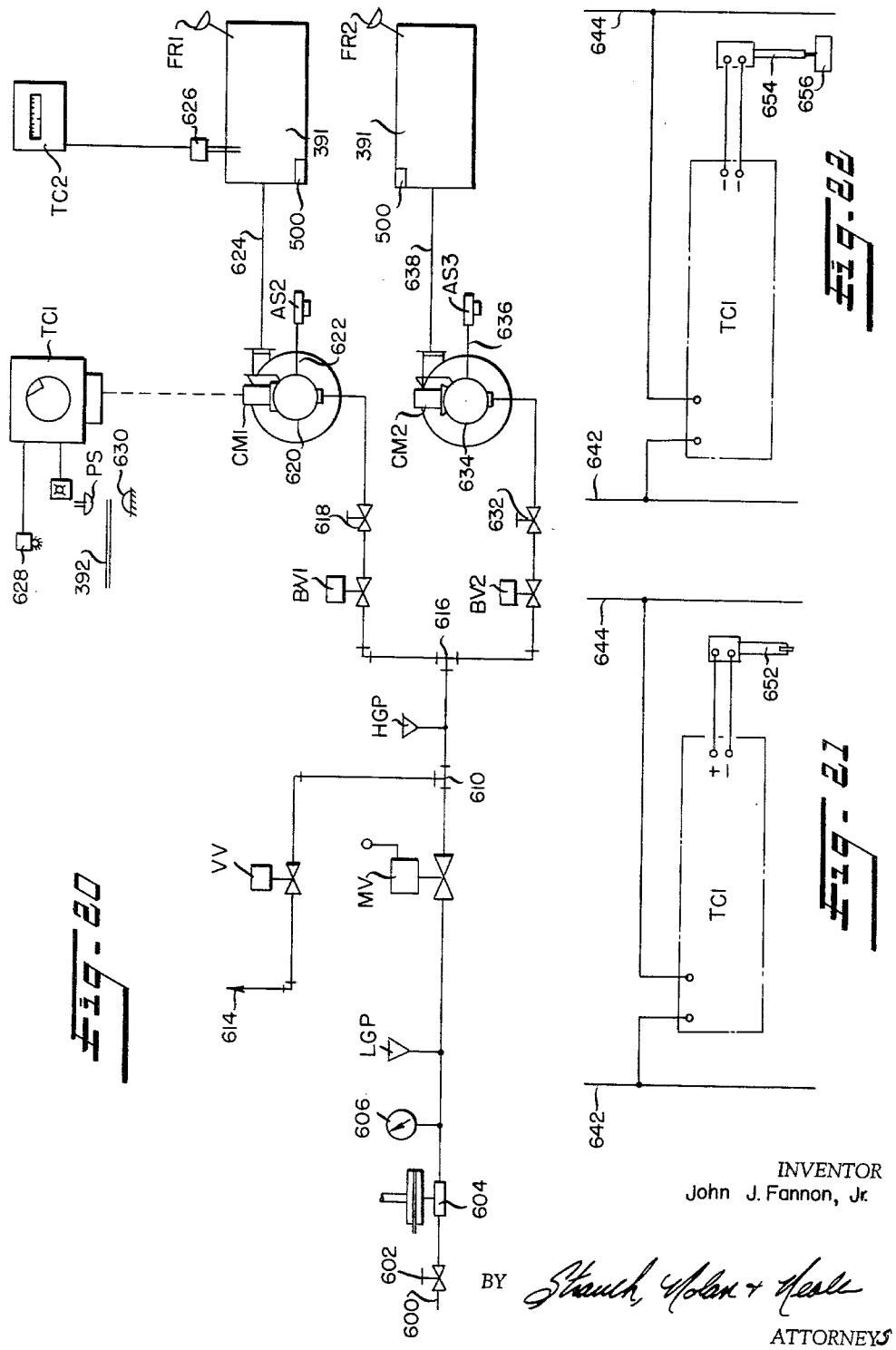

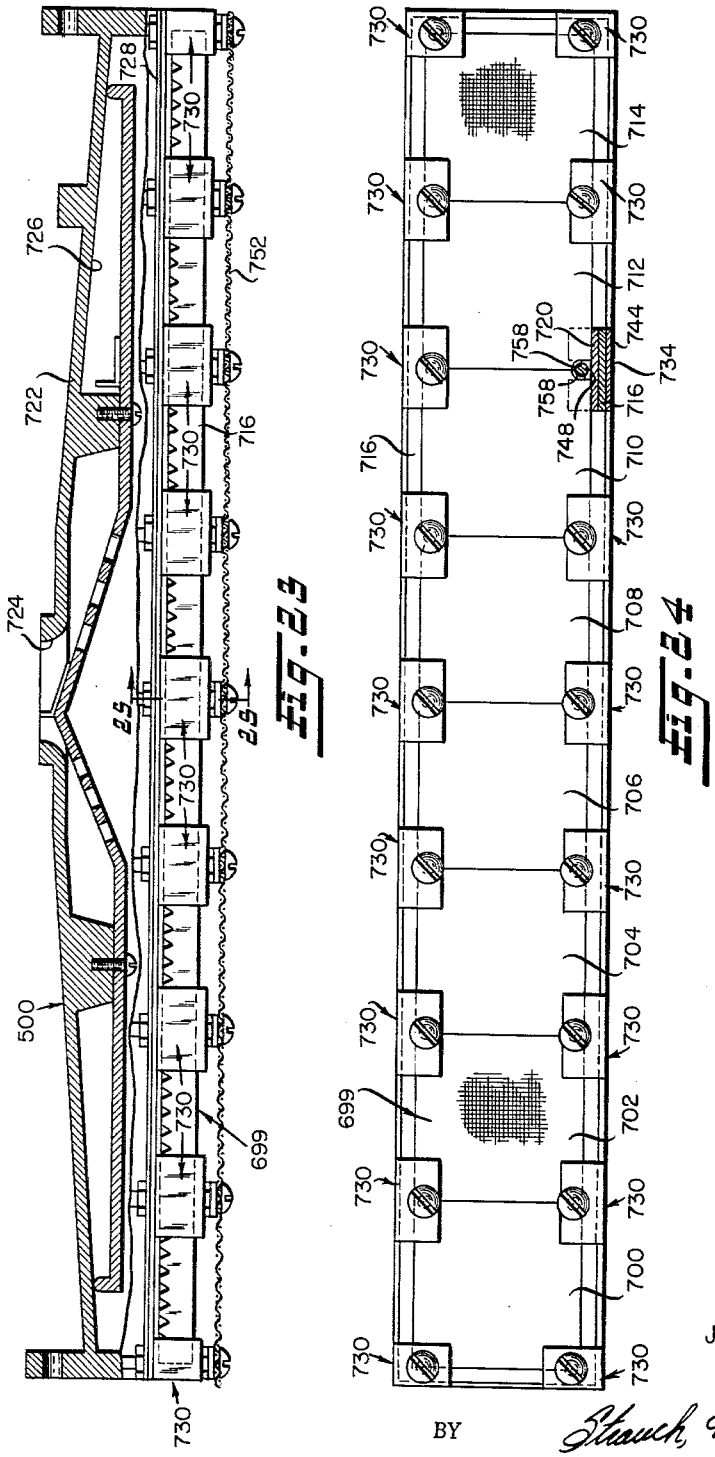

Jan. 11, 1966  J. J. FANNON, JR  3,228,113

HEATING APPARATUS AND METHOD

Filed Aug. 18, 1960 18 Sheets-Sheet 17

INVENTOR
John J. Fannon, Jr.

BY

ATTORNEYS

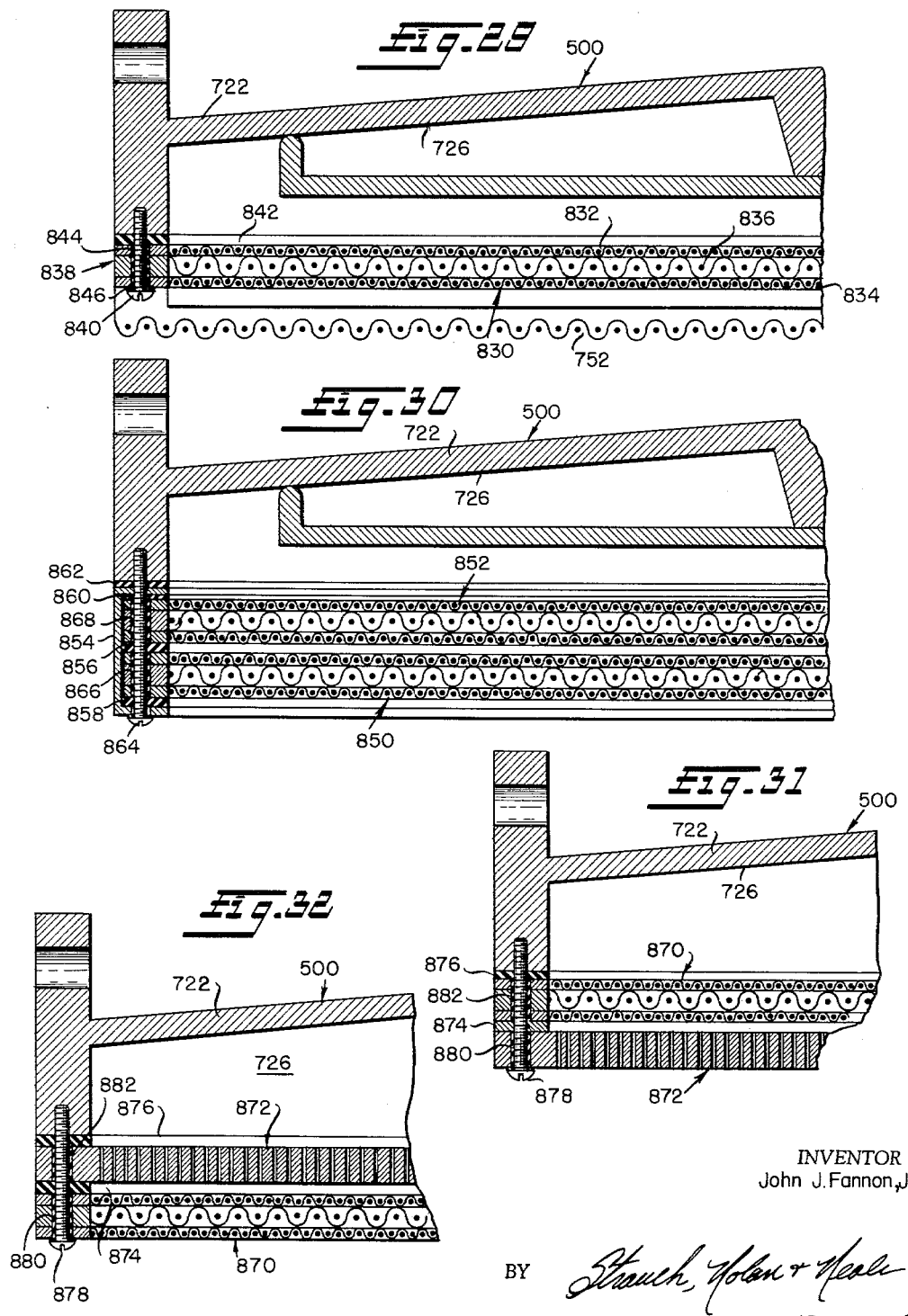

United States Patent Office 3,228,113
Patented Jan. 11, 1966

3,228,113
HEATING APPARATUS AND METHOD
John J. Fannon, Jr., Grosse Pointe Park, Mich., assignor to John J. Fannon Products Co. (a subsidiary of Hupp Corp.), Detroit, Mich., a corporation of Michigan
Filed Aug. 18, 1960, Ser. No. 50,421
17 Claims. (Cl. 34—7)

The present invention relates to ovens, components thereof and drying and curing methods and more particularly to ovens and heating apparatus and methods for drying and curing fluid finishes or coatings applied to a base material which will be heated upon irradiation by infrared radiation. As used in this specification and the appended claims a fluid finish or coating means a material which contains a liquid and a residue which is applied to a surface of a base material, usually metallic, with the residue either in solution or suspension in the liquid and from which the liquid may be volatilized by heating to leave the residue fixed to the surface of the base. While the drying of certain fluid finishes involves merely removal of the solvent and in all case removal of the solvent is the major part of the job, it is only part of the process in paint baking. Most coatings are converted from liquid to solid partly by evaporation of solvent and partly by a chemical reaction, such as polymerization or oxidation which takes place at high temperatures or is accelerated by heat. Therefore the function of the oven is not only to remove the solvent, but to heat the coating to such a temperature as is required to cure the finish, and to maintain this temperature long enough for the reaction to take place. The actual temperature required for optimum results depends on the composition of the coating, but for most organic finishes this is in the range of 300° F. to 600° F. Too low a temperature either prolongs the baking time required or results in a soft coat, while too high a temperature may burn off the finish or cause it to be brittle or to peel off. A coated work piece as used herein means an article to which a fluid finish has been applied to one or more entire surfaces thereof or to any portion or portions of said surface, as for example for protective, decorative and/or informative purposes and, depending upon the context may refer to such a work piece either before or after the liquid has been removed and the residue cured by heat. A work piece may be either a member of predetermined dimensions such as a sheet or of indefinite dimensions such as a strip fed from a roll.

More specifically, this invention relates to conveyor-type ovens for baking finishes on sheet metal parts. These finishes usually contain volatile solvents which must be removed in the baking process. In most cases these solvents are flammable, and if they come in contact with flames or hot elements which supply the heat, there is considerable danger of explosion or fire.

In the past, it has been usual to use indirect heaters, so that the flames and high-temperature parts are not present in the oven where combustible vapors may exist, heated fresh air being ducted into the oven to supply the heat and carry off the vapor. In cases where direct heat has been used, sufficient ventilating air has been supplied so that the mixture of vapor and air is always kept below the explosive range.

Indirect heating is very inefficient, much heat being lost between the burner and parts being baked, and still more heat is carried out of the oven by the hot exhaust gases. In addition, precise specifications of cured coatings hardness and proper curing of certain coatings can only be obtained by direct impingement of infrared radiation upon the coating during curing. When direct heat is used, sufficient air must be mixed with the vapor leaving the wet finish to maintain the mixture so lean that it will not burn, and this air carries out of the oven such a large percentage of the heat, that the efficiency is materially reduced.

Examples of prior art direct infrared generator heating drying ovens are disclosed in the United States Patent No. 2,186,032 issued January 9, 1940 to C. P. Mann for Method and Apparatus for Setting Printing Ink; No. 2,405,813 issued August 13, 1946 to C. E. Blanchard for Drier; No. 2,376,207 issued May 15, 1945 to E. F. Tetzlaff et al. for Drier for Photographic Material; and No. 2,757,426 issued November 20, 1951 to J. L. Parnell for Method of and Apparatus for Treating Edible Produce.

It has been found that infrared radiant energy from high-temperature sources inpinging directly on the coated parts is a most effective and efficient means for baking various types of finishes, and, for high production, the heat concentration (B.t.u. per square foot) must be kept as high as possible. Very high concentrations can be obtained by using gas-fired infrared generators. Electrically generated infrared being of the "near" short wave type is reflected as a lighting and does not penetrate beyond the reflective surface of the uncured coating. Gas generated infrared is immediately converted to heat at the instant of impingement upon the coating with little or no reflection, due to the fact that gas infrared is of the "far" infrared of long wave length which is particularly effective to become absorbed at a high rate rather than being reflected by the highly reflective moisture presenting surface of the uncured coating. From the view point of long life of the generators, it has been found that gas burning infrared generators utilizing the principles described in United States Patent No. 2,775,294 issued December 25, 1956 to Gunther Schwank, particularly with the improvements and modifications as described hereinafter produce excellent results but that gas burning infrared generators of the multiple screen type or gas burning infrared generators utilizing a combination of ceramic tiles and screens produce reasonably satisfactory results.

If sheets or strips of metal are coated with fluid finish containing solvents and are passed through the infrared beams emitted by a series of such infrared generators, arranged so that their radiation beam is directed toward the coated surface, heat will be transferred to the painted surface very efficiently. The basic problems are to remove the solvent vapors and to heat the work pieces rapidly to a suitable temperature to cure the finish properly in a minimum length of time, while preventing overheating of the main bodies of the generators due to reflection of radiant energy from the work pieces. Vaporization of the solvent and baking of the coating are both facilitated by minimizing heat loss from the work pieces.

The minimization of heat loss is accomplished in the present invention by establishing a curtain of rapidly moving air between the radiant faces of the generators and the coated surfaces of work pieces so that the vapor rising from the fluid finish is carried away as rapidly as it rises, but so that this air curtain does not impinge upon and thereby cool either the parts being processed or the generator radiant faces.

Infrared radiation is transmitted through dry air with almost no loss. It therefore impinges on the coating and heats it and the work piece without producing any appreciable rise in the temperature of the intervening air resulting in loss of energy. As a result there is very little loss of energy from the infrared beams due to the heat absorbed by the air stream and carried off in the exhaust gases. Since the air curtain does not stroke the hot infrared radiant generator surfaces or flame, these surfaces are not cooled by the air stream and remain at their most effective high temperature (1650° F. to 2300° F.); and since it does not strike the surface of the parts being processed, they are not cooled, and can be maintained at the desired drying temperature with minimum fuel consumption.

The infrared generators or burners heretofore constructed in accord with principles of said Schwank patent have been designed and intended for use individually as space heaters rather than for use in banks of large numbers of heaters as required by the present invention or in close proximity to a reflective element or work piece to be heated as in the present invention. In such prior art ceramic tile burners, the ceramic tiles have been recessed within and surrounded by a metal flange portion of the metal burner plenum defining housing. In normal use of prior art gas burning infrared generators, the plenum defining housing is normally exposed to ambient air which is effective to cool the housing within acceptable limits and neither the housing nor the radiant wall of the generator is subjected to any appreciable reflected heat from the objects being irradiated. When a plurality of ceramic tile burners are placed in juxtaposition in a bank, the ceramic surfaces of each are separated from the ceramic surface of each adjacent burner by a gap formed by the abutting housing flanges. When a bank of such burners are mounted in close proximity to the surface of a work piece being irradiated, a large amount of heat is reflected back against the burners. Insofar as this reflected heat impinges upon the radiant faces of the burners, it merely increases the operating temperature of the radiant faces and produces greater efficiency of the overall operation. Insofar as this reflected heat impinges upon any portion of the burner which is in heat conductive relation to the burner housing, however, it results in overheating of the housings, warping of the interior baffles, and, in certain instances, the ignition of the premixed gas and air within the plenum behind the radiant face of the generator. With large numbers of infrared generators mounted in a bank, the ambient air cannot be relied upon to maintain the generator housing cool even if these housings could be fully expoesd. In ovens of the type contemplated by the present invention, however, the normal circulation of ambient air is materially impeded in certain applications due to the necessity of providing air ducts above the burner housings.

The present invention therefore further contemplates infrared generators of improved construction in which overheating of the burner housings and concomitant danger of combustion within the plenums is precluded.

The spacing between the radiant faces of adjacent generators which results in the use of burners of prior construction due to the interposed housing flanges creates a further difficulty. When these prior art burners are used individually, each is provided with its own pilot or spark plug ignitor. When these burners are mounted in banks, it is not feasible economically or practically to do so. As will appear presently herein, a single oven may require four units, each unit containing sixty separate burners. The provision of two hundred forty pilots or spark plug ignitors materially increases the cost of the overall oven. Practically, each of the pilots would be subjected to the high intensity reflected heat which low cost pilot assemblies are not designed to withstand. For these reasons it is necessary to provide a single pilot or spark plug ignitor at a location at which it will not be subjected to an excessive heat which can be utilized to ignite a large number of burners. The above referred to spacing between adjacent generators precludes the effective ignition of one burner by flame propagation from an adjacent ignited burner and thus necessitates use of individual pilots or spark plug ignitors which, as pointed out above is not practical. The present invention further contemplates the solution to this dilemma by extending the radiant surface in each generator to the margin of the plenum defining housing so that, when one burner has been ignited under pilot or spark plug control, the edges of the radiant faces of each adjacent generator are in immediate juxtaposition to an ignited radiant generator face so that each of the other generators in the bank can be rapidly and successively ignited by flame propagation from the originally ignited generator.

While the apparatus and process of the present invention may be applied to other uses and to the drying of parts put into the ovens and removed manually, it has its most important applications where the material being coated passes through an oven containing the radiant heating elements. While one of the features of this process is its application to the drying of finishes containing flammable solvents, it is also useful in drying nonflammable material because of the increased efficiency which can be achieved and in certain aspects has more general application.

With the foregoing in view, the primary object of this invention is to provide a method and apparatus for drying coated work pieces by which the coating is rapidly and efficiently dried without danger of explosion of either the volatilized solvent or of the fuel utilized by the heating apparatus.

More specifically it is an object of this invention to provide a method and apparatus for drying coated work pieces by irradiation thereof with infrared radiation from one or more sources at a temperature where visible radiance is emitted, preferably in the order of 1650° F. to 2300° F.

A further object of this invention is to provide a method and apparatus for drying coated work pieces by irradiation with infrared radiation from a source at a temperature in the order of 1650° F. to 2300° F. through a rapidly moving air curtain which maintains the radiation source and the work piece in mutual isolation to preclude ignition of volatilized solvent by contact with the radiation source.

A further important object of this invention is to provide a gas burning infrared generator of improved construction and adapted for use in irradiating heat reflective work pieces in close proximity to the radiant face of the generator without overheating the generator housing structure.

More specifically it is an object of this invention to provide a gas burning infrared generator of such improved construction that such generators can be arranged in banks formed of a large number of generators juxtaposed in side by side and end to end relation without overheating of the generator housings.

More specifically it is an object of the present invention to provide an improved large radiant area heater comprising at least one row of gas burning infrared generators in which overheating of the generator housing is precluded by thermally isolating the radiants from the generator housing structure.

A further object of this invention is to provide an improved gas burning infrared generator of the perforated ceramic tile type in which the ceramic tiles are mounted in thermally isolated relation from the plenum defining generator housing.

A further object of this invention is to provide an improved gas burning infra-red generator adapted to withstand high degrees of reflected radiation and embodying a radiant wall and a parallel wall with similar gas burning characteristics interposed between the radiant wall and the source of premixed gas and air whereby danger of flash back to the source in the event of overheating of the radiant wall due to excessive heat reflection onto said radiant wall is minimized.

A subsidiary object of this invention is to provide an improved gas burning infrared generator of the type specified in the preceding object in which either or both of said walls are of perforated ceramic tile or multiple ply radiant screen assemblies of the type in which the openings of the intermediate screen are of greater size than those of the interior and exterior screens which are of substantially equal mesh.

A further important object of this invention is to provide an improved large radiant area heater formed of at least one row of juxtaposed infrared generators in which the generators are of such construction that the adjacent edges of the radiant faces of adjacent generators are sufficiently close that ignition of one generator can be effected by propagation of flame from an adjacent ignited generator.

A further object of the present invention is to provide in a large radiant area gas burning infrared heater formed of a plurality of juxtaposed gas burning infrared generators having an ignitor in the form of a pilot or spark plug, for example, associated with but one of said plurality of generators, a means for igniting all but said one of said generators by flame propagation from such one generator following its ignition from the ignitor.

A further important object of this invention is to provide an improved gas burning infrared generator having a perforated radiant wall and a housing structure cooperating with said wall to define a plenum in which the projection of the profile of said housing upon the plane of said wall falls within the confines of the profile of said wall so that said wall forms a shield for the housing from reflected radiation from the object being irradiated by the radiant face of the wall.

As a coated work piece passes through a drying oven, the work piece and the coating thereon are gradually heated to a temperature at which the solvent in the coating will volatilize. The volume of solvent being volatilized reaches a maximum at a region at a predetermined distance from the work piece discharge end of the oven. In order to maintain an effective air curtain between the work pieces and the gas burning infrared generators, the air curtain must have sufficient evacuating capacity at least at the region of maximum solvent volatilization to maintain the ratio of solvent to air at that region at an acceptably low limit to prevent solvent ignition.

To achieve this result it is a further important object of this invention to provide, in a gas burning infrared generator equipped drying oven, a solvent evacuating air curtain establishing air guide structure which has a sufficient volatilized solvent evacuating capacity to maintain the solvent concentration and temperature below that required for solvent ignition and, more particularly in multiple section ovens of that type, to provide air guide structure providing an air curtain section in each oven section the volatilzed solvent evacuating capacity of which is directly correlated to the volume of solvent volatilized in the associated oven section during normal oven operation.

These and other objects of the present invention will become more fully apparent by reference to the appended claims as the following detailed description proceeds in reference to the accompanying drawings wherein:

FIGURE 1 is a diagrammatic illustration of a first drying oven embodiment constructed in accord with the principles of and utilizing the method of the present invention and in which a volatilized solvent removing air stream shield is directed longitudinally of the direction of work piece movement intermediate the gas burning infrared radiant generators and the path of coated work piece movement;

FIGURE 2 is a top plan diagrammatic view of the embodiment of the invention illustrated in FIGURE 1;

FIGURE 3 is a longitudinal center line section through a second drying oven embodiment of the present invention in which a volatilized solvent removing air stream shield directed transversely of the path of work piece movement is utilized.

FIGURE 4 is a top plan view of the embodiment of FIGURE 3;

FIGURE 5 is a transverse sectional view taken substantially along the line 5—5 of FIGURE 3;

FIGURE 6 is a view similar to FIGURE 3 of a multi-section oven utilizing a volatilized solvent removing air stream directed longitudinally of the work piece path;

FIGURE 7 is a top plan view of the oven of FIGURE 6;

FIGURE 8 is a sectional view taken substantially along the line 8—8 of FIGURE 6;

FIGURE 9 is a diagrammatic illustration of a fourth embodiment of the present invention in which vertically oriented work pieces having the fluid coating applied to both sides thereof may be rapidly dried;

FIGURE 10 is a diagrammatic side elevational view of the apparatus illustrated in FIGURE 9.

FIGURE 16 is a plan view of the multisection oven of FIGURE 11 with the air duct structure removed and illustrating the conduits for supplying premixed gaseous fuel and air to the infrared generators of the oven;

FIGURE 17 is a sectional view taken along the line 17—17 of FIGURE 16;

FIGURE 18 is a sectional view taken along the line 18—18 of FIGURE 17;

FIGURE 19 is a diagram illustrating the relation of FIGURES 19A and 19B which together constitute a schematic diagram of the control circuit for the oven of FIGURES 11–18;

FIGURE 20 is a diagrammatic illustration of the air-gaseous fuel mixing and control arrangement for the oven of FIGURES 11–19;

FIGURES 21 and 22 are fragmentary circuit diagrams of modifications of the circuit illustrated in FIGURE 19;

FIGURE 23 is a side elevational view, partially in section, of an improved infrared generator especially constructed for high temperature oven use;

FIGURE 24 is a bottom plan view of the burner of FIGURE 23;

FIGURE 29 is a fragmentary longitudinal section through a gas burning infrared generator utilizing a three ply screen radiant wall adapted for use in an oven in accord with the present invention;

FIGURE 30 is a view similar to FIGURE 29 of a further embodiment of the invention utilizing a pair of spaced multiple ply screen walls;

FIGURE 31 is a view similar to FIGURE 29 of a further embodiment of the invention utilizing an exterior ceramic tile and a spaced parallel interior multiple ply screen wall; and FIGURE 32 is a view similar to FIGURE 29 of a further embodiment of this invention utilizing an exterior multiple ply screen wall with an interior ceramic tile wall.

*First oven embodiment*

Figure 11:
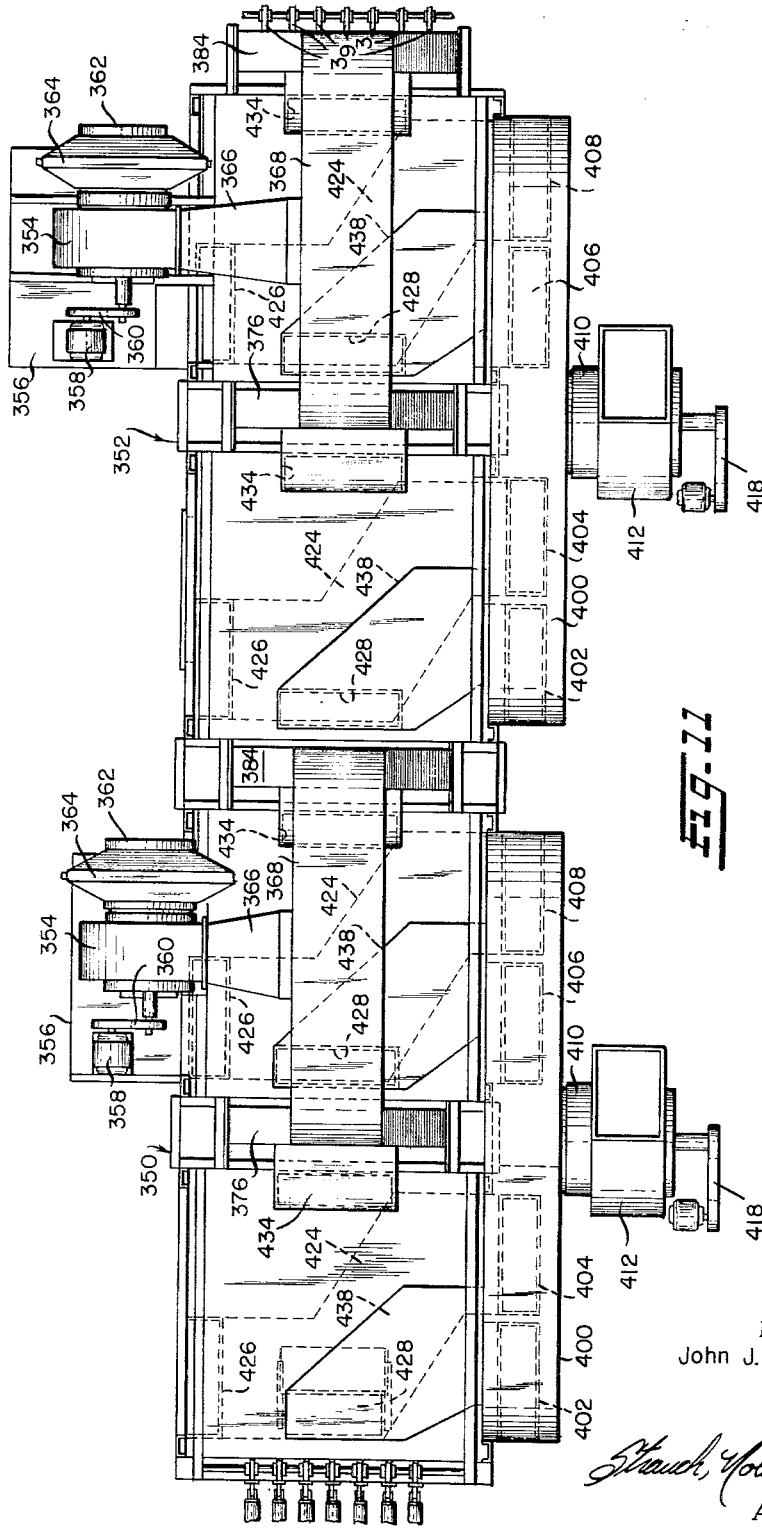
FIGURE 11 is a top plan view of a high capacity drying oven constituting a fifth embodiment of the present invention.

Referring now to the drawings in detail, particularly to the embodiment illustrated in FIGURES 1 and 2, the drying apparatus therein illustrated is adapted for use in situations where a relatively small amount of heat is necessary to completely dry the work pieces with resultant fewer number of infrared generators being required. This apparatus comprises a plurality of adjacently disposed gas burning infrared generators 20, 22, 24 and 26 connected by individual inlet conduits 28, 30, 32 and 34 to a common inlet manifold 36 connected to a suitable source of premixed gas and air constituting a primary completely combustible mixture. The infrared generators 20, 22, 24, and 26 may be any suitable gas burning infrared generator but are preferably of the radiant tile type utilizing the principles described and illustrated in United States Letters Patent No. 2,775,294 issued December 25, 1956 to Gunther Schwank and preferably is of one of the constructions illustrated in FIGURES 24–32 hereof to be described in detail hereinafter. As so constructed each generator comprises either a plurality of perforated tiles having their exposed faces disposed in a common plane defining, when the generator is operative, a planar face heated to visibly radiant temperature, in the order of 1650° F. to 2300° F. or a multiple screen assembly defining such a face as hereinafter described. The radiant faces of the generators 20, 22, 24 and 26 are preferably disposed in a common plane parallel to and spaced from the preferably substantially planar path of movement of coated work pieces such as 38 and 40 along a suitable endless conveyor 42 moving to the right as illustrated in FIGURE 1 as indicated by the arrow 44. The generators 20, 22, 24 and 26 thus each direct a generally rectangular beam of infrared radiation against the conveyor 42 which is intercepted by the work pieces as they move with conveyor 42.

It is a distinctive characteristic of infrared generators of this type that they are supplied with 100% primary air, that is sufficient air is intermixed with the gaseous fuel before it reaches the combustion zone to effect complete combustion thereof at the combustion zone without secondary oxygen supplied from the ambient air about the burner or generator. It is this characteristic of these generators which enables combustion of the fuel to take place at or adjacent the radiant face of the generator and heat that face to visibly radiant temperature. As will be explained, the air and gas is preferably positively premixed prior to introduction into the plenum of each generator to assure effective control and optimum burning efficiency rather than relying upon induced air flow as in the conventional use of infrared generators of this type. A spacing of 6" to 24" between the generator radiant faces and the conveyor with a conveyor velocity of 30 to 90 feet per minute produces excellent results.

Since the overall length of the oven is relatively short in this embodiment, the required air curtain can be established and maintained in but a single section. For this purpose, located adjacent the discharge end of conveyor 42 is a high capacity air blower 46 and located adjacent the infeed end of the conveyor 42 is a high capacity exhaust blower 48.

The radiant faces of generators 20, 22, 24 and 26 are each of sufficient length transversely of the direction of movement of the work pieces 38 and 40 that the beams of infrared radiant energy emitted thereby are substantially equal to or greater than the maximum width of the work pieces 38 transversely of their direction of movement and are located directly above the path of work piece movement so that as the work pieces move beneath the generators, the work pieces successively intercept and are irradiated by the beams from the generators over their entire top surfaces exposed to the generators.

The blower 46 is equipped with a discharge nozzle 50 which is quite narrow in a direction normal to the direction of movement of the conveyor 42 and sufficiently wide transversely of the conveyor to provide a thin air stream or curtain at least equal in width to the maximum width of the work pieces 38 and 40 and preferably substantially equal in width to the dimension of the generators 20, 22, 24 and 26 transversely of the direction of work piece movement. Exhaust blower 48 is provided with a similarly shaped nozzle 52 which is of slightly greater width and height at its inlet opening than that of the outlet opening of the nozzle 50 of the blower 46. The inlet opening of the nozzle 52 is directly aligned with the outlet opening of the nozzle 50 so that the stream of air discharged from the nozzle 50 is directed into the inlet of the nozzle 52. The capacity of the exhaust blower 48 is substantially greater than the capacity of the blower 46 and the inlet of nozzle 52 is slightly greater than the outlet of nozzle 50 for a purpose which will be explained presently.

Nozzles 50 and 52 establish a thin wide stream of air flowing between the path of movement of the work pieces and the radiant faces of the generators 20, 22, 24 and 26 through the beams of infrared radiation emitted by the generators. The air of this stream indicated by the arrows 54 is dry and at ambient temperature and therefore has very little tendency to absorb radiant energy from the beams emitted by the generators 20, 22, 24 and 26. The radiant energy emitted by the generators 20, 22, 24 and 26 passes through air stream or curtain 54 and irradiates the work pieces 38 and 40. The intensity of the irradiation of the work pieces 38 and 40 and the energy absorbed by the work pieces 38 and 40 is sufficient to heat them to a temperature at which the liquid solvent of the fluid finish applied to the surface of the work pieces 38 and 40 and exposed to the radiant faces of the generators 20, 22, 24 and 26 will volatilize. As explained above, the solvents used in the fluid finishes which will normally be dried in this furnace are highly combustible. It will be appreciated that as a cold work piece passes beneath generator 20 it will be heated but little or no solvent will be vaporized but that as the work piece passes successively beneath generators 22, 24, and 26 it will reach a temperature at which there is a maximum solvent vaporization and that, while the temperature of the work piece will continue to increase so long as it is subjected to irradiation, the amount of solvent being vaporized will gradually decrease from the maximum until as the work piece passes from the beam of generator 26 it is perfectly dry and no further solvent volatilization occurs. The velocity and quantity of air in the air stream 54 is controlled to maintain the proportion of volatilized solvent in the stream 54 at all points well below the proportion and temperature of ignition of the volatilized solvent despite the lack of uniformity of solvent volatilization at all points along the path of work piece movement.

The addition of the volatilized solvent particles and the products of combustion from the generators 20, 22, 24 and 26 to the stream 54 increases its volume and tends to warm the air particles in that stream thus further increasing the volume of the stream 54 as it approaches the nozzle 52. It is because of this increased volume of the stream 54 as it approaches nozzle 52 that the cross section of the inlet of nozzle 52 must be greater than that of the outlet of nozzle 50 and that the capacity of the blower 48 must be substantially greater than that of the blower 46. With the generator-conveyor spacing and conveyor velocity above referred to, the exhaust blower 48 should be capable of exhausting 7000 cubic feet of air per minute at 70° F. at a velocity of 500 feet per minute through its inlet nozzle. Both the velocity and the volume required will of course vary with the particular application of the oven. It has been found that for the usual solvents used, such as toluol, 15,000 cubic feet per minute of air will remove 1.5 gallons of solvent per minute. A subatmospheric pressure should be maintained in the oven adjacent the inlet of nozzle 52 to assure that no portion of the usually combustible volatilized solvent particles pass through the stream 54 toward the infrared generators 20, 22, 24 and 26 to be heated to their ignition temperature. With the infrared generators of the above described type normally operated with just sufficient air to effect complete combustion, the atmosphere between the radiant faces of generators 20, 22, 24 and 26 and the air stream 54 does not have sufficient oxygen to support combustion of the volatilized solvent particles even if heated to their ignition temperature. In this embodiment of the invention, the air curtain is in but a single section, the direction of the air stream 54 being longitudinal of the direction of the work piece movement through the oven and in the opposite direction to the direction of the work piece movement so that, as each work piece becomes progressively hotter as it advances in succession through the beams of infrared generators 20, 22, 24 and 26, it passes progressively toward the cooler and less contaminated portion of the air stream 54. By this arrangement, particles of volatilized solvent evaporated from the work piece when the particles are most highly heated contact the air stream 54 at its coolest region. The cool air stream rapidly cools the volatilized solvent particles below their ignition temperature.

As a specific example, utilizing a work piece having a sheet metal base formed of cold rolled steel, aluminum stampings or all metal electroplated surfaces and a fluid finish consisting of organic coatings and toluol as a solvent, the radiant faces of the infrared generators 20, 22, 24 and 26 should be spaced from the adjacent face of the work pieces 38 and 40 a distance of four to six inches, and the air stream 54 should have a minimum linear velocity of eight feet per second in the direction of movement of this stream and a volume sufficient to maintain a minimum 10 to 1 ratio of air to toluol.

It has been found desirable for optimum operation to provide a suitable means for sensing the temperature of the work pieces at various points along their path of movement through the oven and to adjust automatically the rate of firing of the infrared generators and/or the rate of work piece movement to establish the optimum work piece temperature as it is progressively moved through the oven. As explained previously certain coatings can be properly cured only by direct infrared irradiation and precise degrees of coating hardnesses of other coatings can only be obtained by direct infrared irradiation. Subject to these limitations, however, the parts may be coated on one or both sides. Where the coating has been applied to both sides of sheet material, the warm vapors leaving the under side of the sheet will rise around the edges thereof and mingle with the vapors leaving the upper surface. The area of contact of the sheets with their supports on the conveyor will in such cases be kept as small as possible to minimize marks on the finish on the under side.

Second oven embodiment

The second embodiment of the present invention is illustrated in FIGURES 3, 4 and 5. This embodiment illustrates one application of the present invention to an oven which must be of such overall length that it is impossible to establish and control the volatilized solvent evacuating air curtain in a single uninterrupted section. The oven therein illustrated includes a frame structure formed by uprights 60, interconnected longitudinal channel 62 and transverse angle members 64. Mounted upon the frame structure are a plurality of parallel rows of gas burning infrared generators 66. The specific illustrated embodiment includes twelve gas burning infrared generators 66 per row and there are twenty parallel longitudinally extending rows, all of the burners in each row being fed from a common input manifold (not shown) but each row or pre-selected groups of rows, as explained hereinafter in detail in reference to the fifth oven embodiment, being separately supplied with air and combustion gas so that the rows or groups of rows may be controlled or shut off independently. The generators 66 are preferably of one of the types disclosed in FIGURES 24–32 hereof. Coated work pieces are fed through the oven by a conveyor 67 comprising a pair of spaced parallel endless chains 68 and 70, each extending in a continuous path defined by four sprockets 72, 74, 76 and 78. The center line to center line spacing between sprockets 72 and 74, defining the forward run of conveyor 67, in the illustrated embodiment is thirty feet zero inches. The linear speed of the conveyor 67 is normally within the range of thirty to ninety feet per minute in this embodiment. The chains 68 and 70 are interconnected by a plurality of transversely extending parallel rigid metal strips or slats 80 which, between sprockets 72 and 74, define the support surface of conveyor 67 for the coated work pieces fed through the oven. The spacing between the top surface of the slats 80 as they are fed in the forward conveyor run between sprockets 72 and 74 and the plane of the radiant faces of the generator 66 is variable between six inches and twenty-four inches by means (not shown) for raising and lowering the generators 66.

As in the first oven embodiment, the path of coated work piece movement is shielded from the radiant faces of the generator 66 by an air stream, which in this embodiment as illustrated is formed in four sections. For this purpose a series of transversely directed discharge nozzles 82 are longitudinally spaced along one side of the conveyor 67 as illustrated in FIGURES 3 and 5. One discharge nozzle is disposed and extends substantially the entire longitudinal distance between each adjacent pair of the uprights 60, as illustrated in FIGURE 3. As illustrated in FIGURE 5, each nozzle 82 defines the outlet opening for an independent air plenum 84 disposed at the left side of the conveyor 67 as viewed in FIGURE 5, each plenum 84 being fed through an independent inlet duct 86 from a suitable blower as a common source of compressed air. As indicated by the arrows 88 in FIGURE 5, the air stream discharged from each nozzle 82 forms one section of the air curtain and flows transversely of the conveyor 67 into an inlet opening 90 of a laterally opposed plenum 92 at the right side of the conveyor as viewed in FIGURE 5 and from which air is exhausted through a conduit 94 by a suitable exhaust blower (not shown) of higher capacity than that of the supply blower feeding the plenum 84. The inlet opening 90 of the plenum 92 is larger than the discharge opening of the discharge nozzle 82 of the plenum 84 for the same reasons as explained in reference to the first embodiment, that is to accommodate increased volumes of air due to its heating by the products of combustion from generators 66 and by the volatilized solvent particles and the increased volume of the stream due to the presence of the volatilized solvent particles and products of combustion in it. A suitable damper arrangement 96 is provided within each of the plenums 84 for controlling the rate of discharge of air from the associated nozzle 82. Each of the nozzles 82 is individually fed and controlled and discharges into an individually exhausted plenum 92. The inet opening 90 of each of the plenums 92 is at least equally as long longitudinally of the conveyor 67 as the longitudinal extent of the opening from the opposed nozzle 82 at the opposite side of the conveyor 67. As explained in the connection with the first oven embodiment, the volume of solvent volatilized is not uniform along the length of the conveyor but will reach a maximum intermediate the length of the oven. Because of this, one of the air curtain sections of this second oven embodiment is provided with a substanttially greater input and exhaust capacity than the remaining sections of the air stream curtain. Normally the next to the last air curtain section will be the one of largest solvent evacuating capacity but this will vary with the characteristics of the particular drying process.

As explained previously there are twenty rows of gas burning infrared generators, each row being individually fed with a premixed gaseous fuel and 100% primary air and the rows being controlled individually or in pre-selected groups. The purpose of individual control of the rows is to permit reduction in the number of burners used when less than the full width sheet is being fed through the oven. For example, with all twenty rows of infrared generators 66 in operation, the oven will accommodate a sheet sixty inches wide. By cutting off the two outermost rows at each side, and maintaining the sixteen middle rows in operation, the oven will accommodate a 48 inch sheet and by shutting off five rows at each side while retaining the ten center rows in operation the oven will accommodate a 30 inch sheet. For most effective operation, the center line of the sheet being fed through the oven is maintained substantially upon the center line of the oven.

If the material to be baked is in the form of a coil or strip, the strip is carried from a supply coil (not shown) located to the left of the conveyor 67 as viewed in FIGURE 3 to an intermediate point also to the left of the conveyor as viewed in FIGURE 3, where it is coated and then is carried through the oven by the conveyor 67 to a re-winding roll (not shown) disposed at the right of the conveyor as indicated in FIGURE 3 by which it is recoiled.

As is apparent from reference to FIGURE 4, the two sprockets 72 located at opposite sides of the conveyor 67 are fixed to a shaft 100 journalled upon the frame and the two sprockets 74 are fixed to a common shaft 102 also journalled upon the frame. The four lower sprockets 76 and 78 are similarly interconnected by transversely extending shafts (not shown). The shaft 102 is driven by an electric motor powered variable output speed drive unit 104 through a chain 106 in driving engagement with a sprocket 108 fixed to the extreme end of the shaft 102 and a sprocket 110 fixed to the output shaft of the variable drive unit 104.

With the foregoing detailed description, it is apparent that the second oven embodiment of the present invention is basically the same as the first embodiment with the exception that the shielding air stream or curtain, as indicated at 88, is sectional and is directed transversely of the path of work piece movement rather than longitudinally thereof as in the first oven embodiment. This arrangement results in a relatively short length of the stream 88 between the nozzle 82 and the inlet opening 90 and thus minimizes any tendency of the stream to expand sufficiently to contact and thereby cool either the work pieces or the radiant surface of the generators 66 between the nozzle 82 and the exhaust port 90. Contact of the air stream with the radiant surfaces of the generators is undesirable, as it cools the radiants below their most efficient operating temperature and below the desired optimum drying temperature and also may result in combustion of the volatilized solvents adjacent the surfaces of the work pieces.

*Third oven embodiment*

The third oven embodiment of the present invention is illustrated in FIGURES 6, 7, and 8. This embodiment is in all material respects the same as the second oven embodiment with the exception that the direction of air flow in each section of the multiple section air curtain is longitudinal of and opposite to the direction of work piece movement rather than transversely thereof as in the second oven embodiment. The oven therein illustrated includes four sections 150, 152, 154, and 156 each defined by a frame structure formed by uprights 160 interconnected by longitudinal channel members 162 and transverse angle members 164. Mounted upon the frame structure are a plurality of parallel rows of gas burning infrared generators 166. The specific illustrated embodiment includes twelve gas burning infrared generators per row (three in each section) and there are twenty parallel longitudinally extending rows extending through all four sections 150, 152, 154 and 156, all of the burners in each row being fed from a common input manifold (not shown) but each row or pre-selected groups of rows being separately supplied with premixed air and combustion gas so that the rows may be controlled or shut off independently as in the second embodiment. The generators 166 are preferably of one of the types disclosed in FIGURES 24–32 hereof. Coated work pieces are fed through the oven by a conveyor 167 comprising a pair of spaced parallel endless chains 168 and 170, each extending in a continuous path defined by four sprockets 172, 174, 176 and 178. The center line to center line spacing between sprockets 172 and 174, defining the forward run of conveyor 167, the illustrated embodiment is thirty feet zero inches. The linear speed of the conveyor 167 is normally within the range of thirty to ninety feet per minute in this embodiment. The chains 168 and 170 are interconnected by a plurality of transversely extending parallel rigid metal strips or slats 180 which between sprockets 172 and 174 define the support surface of conveyor 167 for the coated work pieces fed through the oven. The spacing between the top surface of the slats 180 as they are fed in the forward conveyor run between sprockets 172 and 174 and the plane of the radiant faces of the generators 166 is variable between six inches and twenty-four inches by means (not shown) for raising and lowering the generators 166.

As in the previous embodiment, the path of coated work piece movement is shielded from the radiant faces of the generators 166 by a multisection air stream. For this purpose a series of longitudinally directed discharge nozzles 182 are mounted transversely above conveyor 167 longitudinally spaced along the conveyor 167 one at the discharge end of each of the sections 150, 152, 154 and 156 as illustrated in FIGURES 6 and 7. Each discharge nozzle 182 extends substantially the entire width across the conveyor 167. As illustrated in FIGURES 7 and 8, each nozzle 182 defines the outlet opening for an independent air plenum 184 disposed at the left side of the conveyor 167 as viewed in FIGURE 8, each plenum 184 being fed through an independent inlet duct 186 from a suitable blower as a common source of compressed air, as indicated by the arrows 188 in FIGURES 6 and 7, the sections of the air stream curtain discharged from nozzles 182 flow longitudinally of the conveyor 167 into inlet openings 190 of longitudinally opposed plenums 192 at the work piece inlet end of each of the oven sections 150, 152, 154 and 156 from which air is exhausted through a conduit 194 by a usitable exhaust blower (not shown) of higher capacity than that of the supply blower feeding the plenum 184. The inlet opening 190 of the plenum 192 is larger than the discharge opening of the discharge nozzle 182 of the plenum 184 for the same reasons as explained in reference to the first and second embodiments, that is to accommodate an increased volume of air due to its heating by products of combustion from generators 166 and by the volatilized solvent particles and the increased volume of the stream due to the presence of the volatilized solvent particles and products of combustion in it. A suitable damper arrangement (not shown) is provided within each of the plenums 184 for controlling the rate of discharge of air from the associated nuzzle 182. Each of the nozzles 182 is individually fed and controlled and discharges into an individually exhausted plenum 192. The inlet opening 190 of each of the plenums 192 is at least equally as long transversely of the conveyor 167 as the longitudinal extent of the opening from the opposed nozzle 182 at the opposite end of the oven section. As in the second embodiment, the air curtain section associated with one of the oven sections 150, 152, 154 and 156 must have greater volatilized solvent evacuating capacity than the others. Usually, this will be that of oven section 154.

As explained previously there are twenty rows of gas burning infrared generators, each row being individually fed with a mixture of gaseous fuels with 100% primary air and each row being individually controlled. The purpose of individual control of the rows is the same as in the second burner embodiment.

As in the second embodiment, if the material to be baked is in the form of a coil or strip, the strip is carried from a supply coil (not shown) located to the left of the conveyor 167 as viewed in FIGURE 6 to an intermediate point also to the left of the conveyor 167, as viewed in FIGURE 6, where it is coated and then is carried through the oven by the conveyor 167 to a re-winding roll (not shown) disposed at the right of the conveyor as indicated in FIGURE 6 by which it is recoiled.

As is apparent from reference to FIGURE 7, the two sprockets 172 located at opposited sides of the conveyor 167 are fixed to a shaft 200 journalled upon the frame and the two sprockets 174 are fixed to a common shaft 202 also journalled upon the frame. The four lower sprockets 176 and 178 are similarly interconnected by transversely extending shafts (not shown). The shaft 202 is driven by an electric motor powered variable output speed drive unit 204 through a chain 206 in driving engagement with a sprocket 208 fixed to the extreme end of the shaft 202 and a sprocket 210 fixed to the output shaft of the variable drive unit 204.

With the foregoing detailed description, it is apparent that the third oven embodiment of the present invention is basically the same as the second oven embodiment with the exception that the shielding multiple section air stream or curtain, as indicated at 188, is directed longitudinally of the path of work piece movement rather than transversely thereof as in the second oven embodiment. This arrangement, as in the second oven embodiment, results in a relatively short length of the stream 188 between the nozzle 182 and the inlet opening 190 and thus minimizes any tendency of the stream to expand sufficiently to contact and thereby cool either the work pieces or the radiant surface of the generators 166 between the nozzle 182 and the exhaust port 190 but, in addition, maintains the advantages of an air curtain flowing longitudinally of and opposite to the direction of work piece movement as in the first oven embodiment.

*Fourth oven embodiment*

The fourth oven embodiment of this invention illustrates its applicability to the drying of work pieces coated on both sides. For this purpose, work pieces such as 250 (FIGURES 9 and 10) are suspended upon hanger brackets 252 mounted for movement longitudinally of a monorail conveyor 254. Mounted at the opposite sides of the path of movement of work pieces 250 are banks 256 and 258 of gas burner infrared generators of one of the types illustrated in FIGURES 24-32, each bank being provided with six groups of generators 259, 260, 262, 264, 266, and 268 which are fed with a 100% premixed primary air mixture from a supply manifold 270 connected to a suitable source of air and gaseous fuel (not shown). The generator banks 256 and 258 are isolated from the work piece 250 by air curtains 272 and 274 emitted respectively by nozzles 276 and 278 of rectangular cross-section from a suitable blower 280 and directed into the rectangular inlet throats 282 and 284 respectively of an exhaust duct system 286 connected to exhaust blower 288.

The relative proportions of the component parts, relative speeds of movement of the work pieces and the air streams and the mode of operation of this embodiment of the invention are in all material respects the same as in the previous embodiments.

*Fifth oven embodiment*

Figure 14:
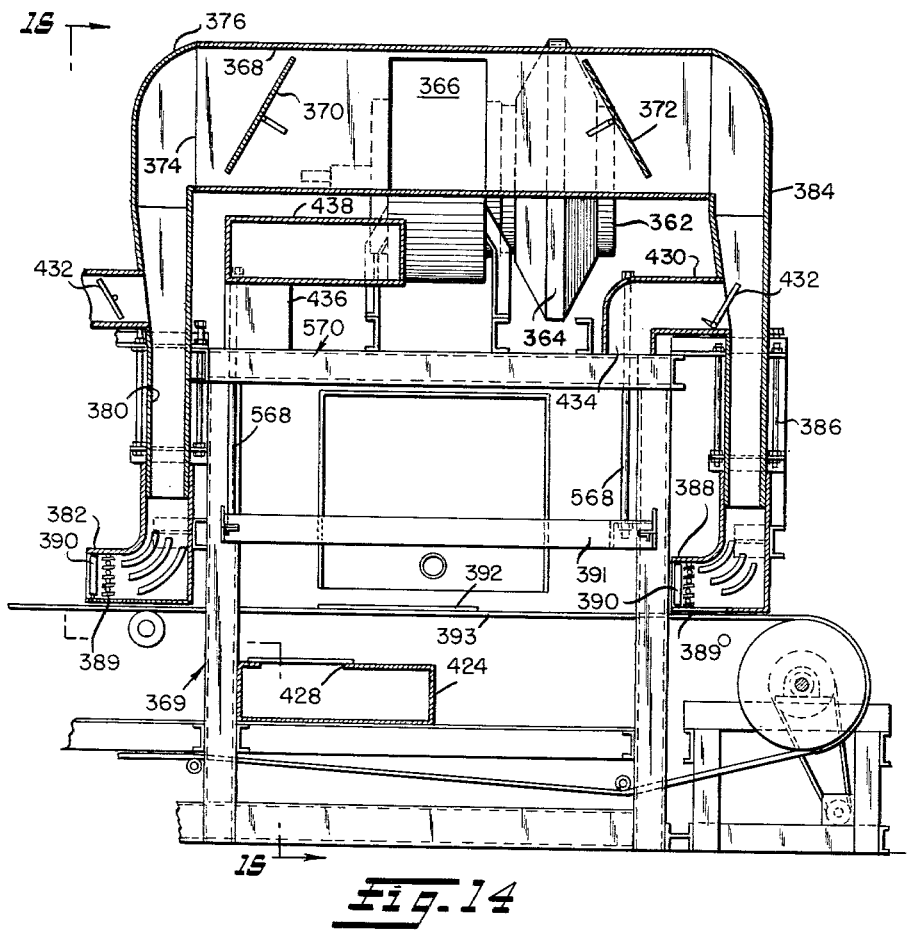
FIGURE 14 is a longitudinal center line section taken substantially along the line 14—14 of FIGURE 12.

The fifth oven embodiment of the invention is illustrated in FIGURES 11 through 20 inclusive. Referring first to FIGURE 11 which is a top plan view of the entire unit, this oven comprises two oven units 350 and 352 of substantially identical construction each divided into two sections and each provided with an independent air supply and exhaust system. Units 350 and 352 are arranged in longitudinally aligned end to end relation as illustrated in FIGURE 11 to form one continuous longitudinally elongate open ended and otherwise enclosed oven through the two units 350 and 352 of which, coated work pieces are fed by a conveyor from left to right as viewed in FIGURE 11. The air guide structure for establishing the air curtain sections of the unit 352 is shown in greater detail in FIGURES 12-15 inclusive. The unit 352 is provided with a blower 354 mounted upon a suitable support frame 356 and driven by an electric motor 358 through a belt drive 360. Ambient air is drawn into the blower 354 through an inlet port 362 and a replaceable air filter 364 and is discharged from the blower 354 at superatmospheric pressure through a duct 366. As in most clearly shown in FIGURES 12 and 15 duct 366 opens into the longitudinal center of a duct 368 which, as is best illustrated in FIGURE 14, extends longitudinally of the unit 352 at the top thereof above the oven enclosure defined by the framework 369. Duct 368 is provided with adjustable control dampers 370 and 372 adjacent each end to permit control of the relative proportion of flow in opposite directions through duct 368 from the duct 366. At its forward end 374 duct 368 opens into an elbow shaped transition duct section 376 of expanding internal cross section terminating in a downwardly facing end opening 378 connected in direct fluid communication with the downwardly extending conduit 380. Conduit 380 terminates in an elbow section 382 forming an outlet nozzle directing a longitudinally flowing wide air stream through the left hand half of unit 352 as viewed in FIGURE 12. The remaining air entering duct 368 flows past the control damper 372 in conduit 368 and passes into an elbow shaped transition section 384 of similar internally expanding configuration to the transistion section 376. A downwardly extending conduit section 386 of similar cross section to the section 380 is connected between the downwardly facing outlet end of transition section 384 and a discharge nozzle 388 directed to the left longitudinally through the right hand half of the unit 352 as viewed in FIGURE 12 at substantially the same level as the nozzle 382.

Figure 12:
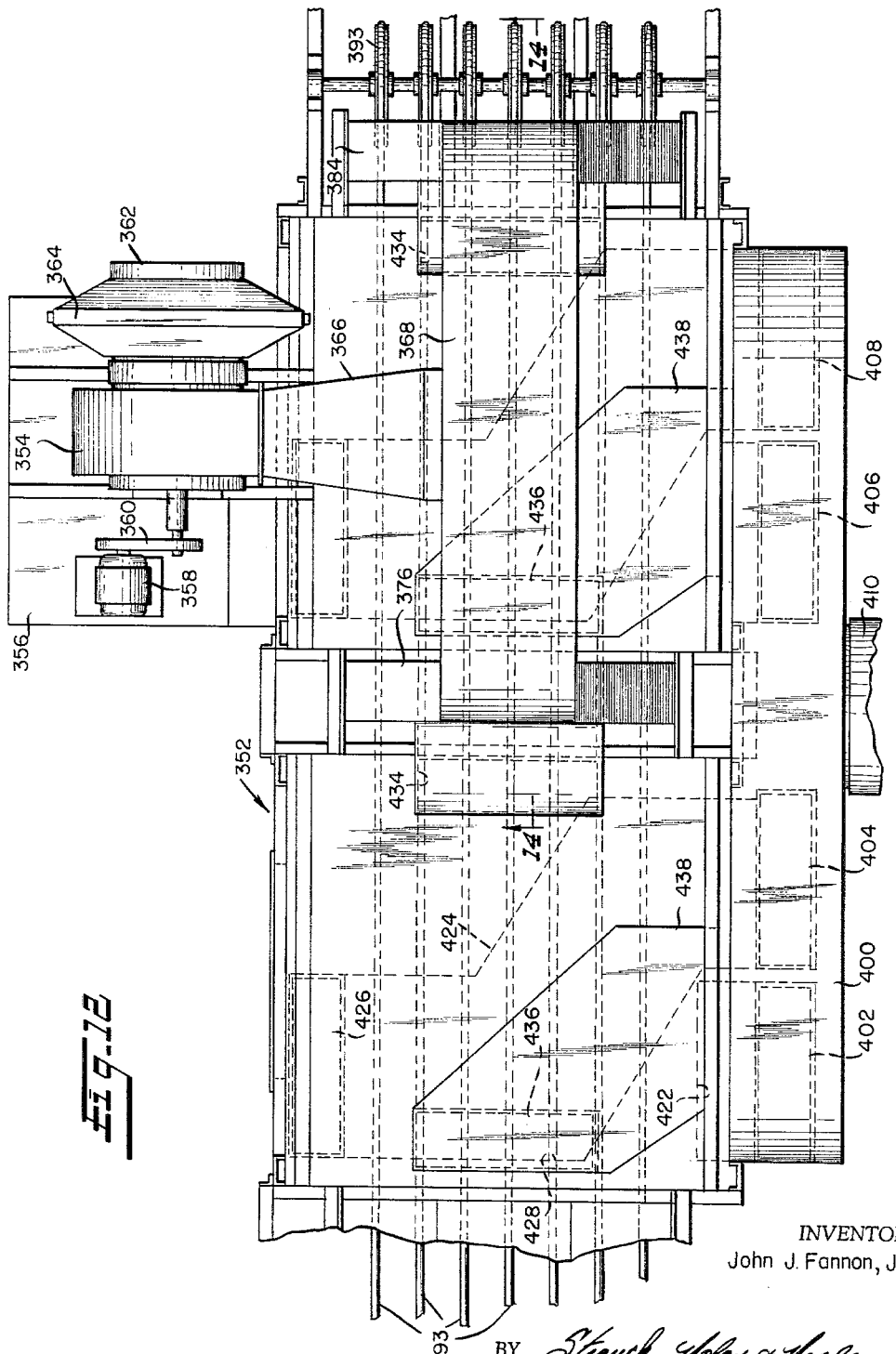
FIGURE 12 is an enlarged top plan view of the right hand half of the apparatus illustrated in FIGURE 11.
Figure 13:
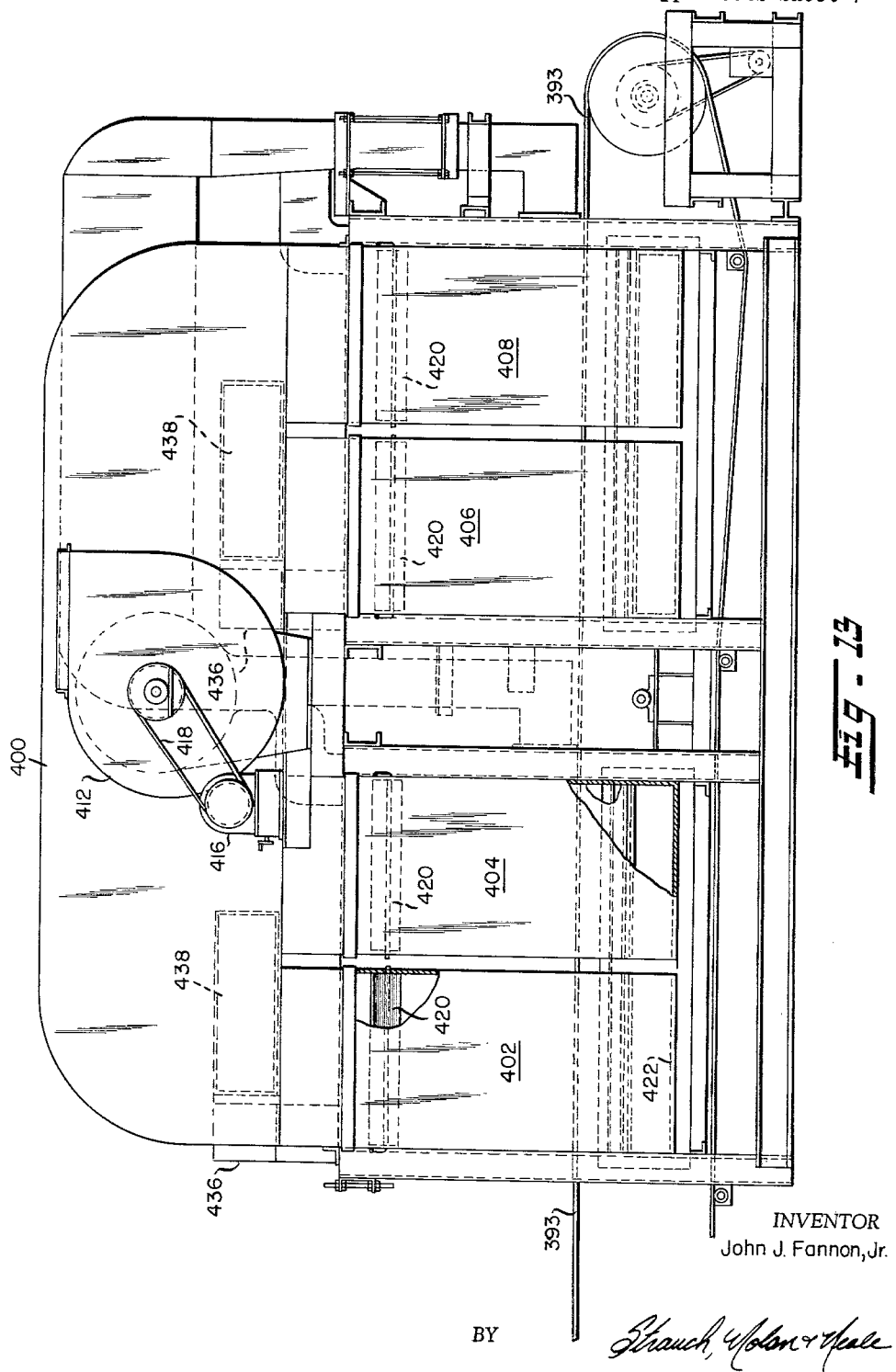
FIGURE 13 is a front elevational view, with certain portions broken away, of the portion of the FIGURE 11 apparatus illustrated in FIGURE 12.

From the foregoing it is apparent in reference to FIGURES 12 and 14 that air flowing from blower 354 through conduit 366 into conduit 368 is split at the center of conduit 368 into two separate flow paths, one flowing to the left as viewed in FIGURE 12 and one to the right. The air stream flowing to the right flows into the transition section 384, downwardly through duct 386 and then is discharged to the left as viewed in FIGURE 12 to provide a stream of air or air curtain section for the right hand half of the unit 352. The other stream flows to the left as viewed in FIGURES 12 and 14 into the transition section 376, downwardly through duct 380 to the discharge nozzle 382 from which it flows to form an air stream flowing to the left as viewed in FIGURES 12 and 14 to form an air curtain section for the left hand half of the unit 352 as viewed in FIGURE 12. Air is directed from nozzles 382 and 388 by horizontally pivoted adjustable louvers 389 and vertically pivoted adjustable louvers 390.

Figure 15:
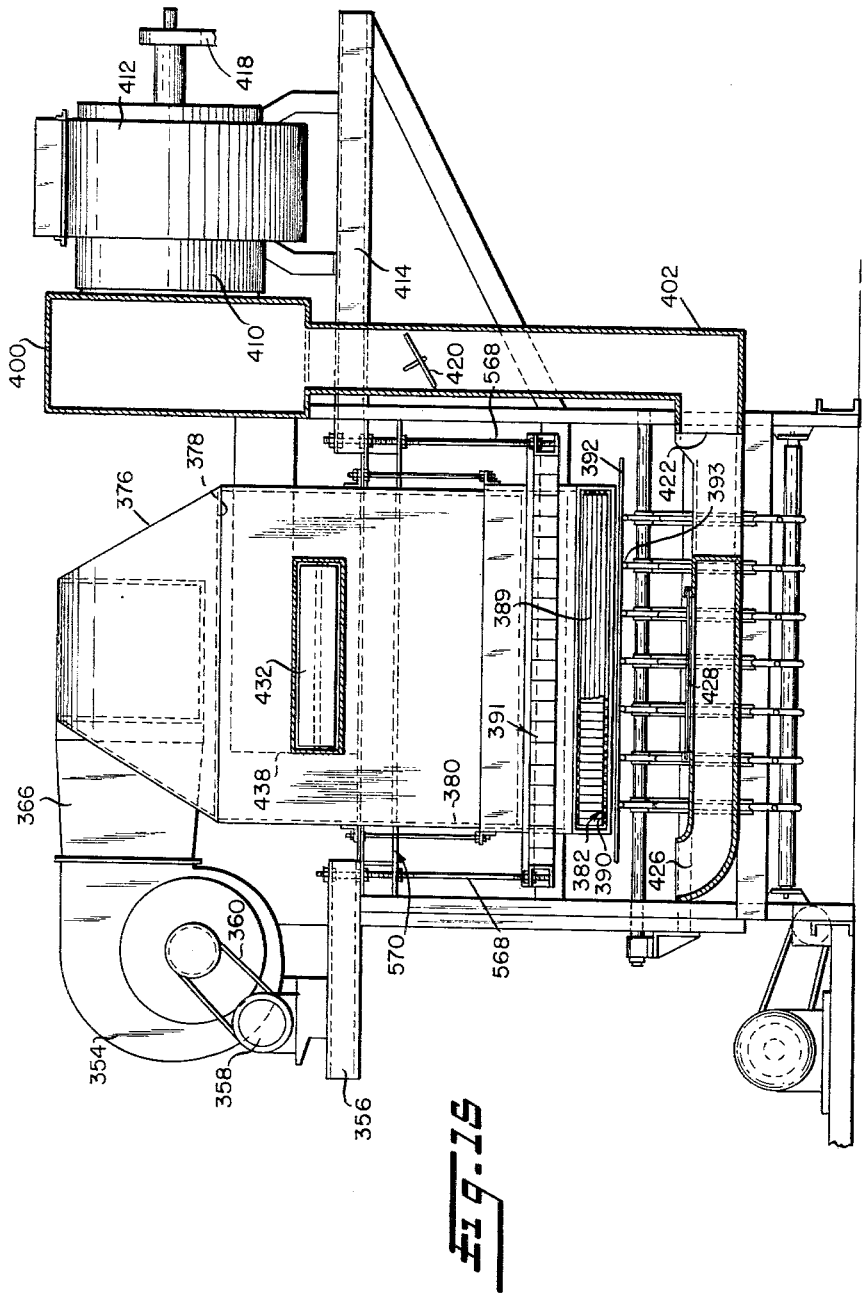
FIGURE 15 is a vertical transverse section view taken substantially along the line 15—15 of FIGURE 14.

As is apparent from FIGURES 14 and 15 and as will be described in greater detail presently in reference to FIGURES 16 to 19, a bank 391 of downwardly facing gas burning infrared generators, similar in construction to that of the second oven embodiment, is mounted within each section of each unit of the oven. Each generator bank 391 consists of a plurality of longitudinally extending rows of gas burning infrared generators, each row having a plurality of end to end disposed generators. One of the banks 391 is located in front of and at a level slightly above the top of the opening of each of the nozzles 382 and 388 so that the air streams discharging from nozzles 382 and 388 are directed beneath the generator bank 391 of the left and right hand half of the unit 352 respectively. The level of the path of work piece movement through the oven is indicated in FIGURE 15 by a work piece 392 which moves in a path determined by the top or forward run of the work piece conveyor 393 through units 350 and 352. From this, it is apparent that the bottom of the discharge openings of the nozzles 382 and 388 is slightly above the level of the path of work piece movement at 392 through the oven as defined by the conveyor.

The air exhaust conduit structure includes a longitudinally extending conduit 400 extending substantially along the entire length of the unit 352, as is apparent from FIGURE 12. Air to be exhausted enters the conduit 400 through a plurality of vertically extending ducts 402, 404, 406 and 408 which are connected in fluid communication with the longitudinal duct 400 extending through openings in the bottom wall of the latter. Air is exhausted from the conduit 400 through a laterally extending exhaust duct 410 located substantially at its longitudinal center and connected to the inlet opening of a centrifugal exhaust blower 412 (FIGURE 15) mounted on a suitable support frame 414 and driven by an electric motor 416 (FIGURE 13) through a belt drive 418. As is clear from FIGURES 13 and 15 each of the vertically extending ducts 402, 404, 406 and 408 is provided with a horizontally pivoted flow control damper 420 to permit individual control of the quantity of air flow there through. Referring to FIGURES 12 and 15, the duct 402 extends to a level beneath the path of work piece movement 392 and is provided with an inlet opening 422 located at the end of the left hand half of unit 352 remote from nozzle 382 as viewed in FIGURES 13 and 14 at the right side of the path of work piece movement as viewed in FIGURE 15. The duct 404 extends downwardly from duct 400 to the same level as the duct 402 (FIGURE 13) and is connected through a conduit 424 (FIGURE 12) extending transversely and longitudinally of the path of work piece movement to an inlet opening 426 (FIGURES 12 and 15) located in lateral alignment with the inlet 422 for the duct 402. The conduit 424 is also provided with an adjustable size inlet opening 428 at the center of and beneath the path of work piece movement to maintain that portion of the oven at sub-atmospheric pressure. As is apparent by reference to FIGURE 15, air is discharged from the nozzle 382 in a direction extending longitudinally of the path of and in a direction opposite to the direction of work piece movement, flowing toward the left hand end of the unit 352 as viewed in FIGURE 12. Due to the sub-atmospheric pressures at each side of the path of work piece movement at the end of the unit 352 remote from the discharge nozzle 382 created by the withdrawal of air through the inlet ports 422 and 426 for the ducts 402 and 404 respectively, the stream discharged from nozzle 382 divides and expands laterally as it approaches the end of unit 352 remote from the discharge nozzle 382 and flows down and around the side of the path of work piece movement into openings 422 and 426 without material contact with the work pieces being fed through the oven.

Since the work piece is being fed through the oven to the right as viewed in FIGURE 12 and the air is being directed from the nozzle 382 to the left as viewed in FIGURE 12, any air which might contact the work piece at the end of the left hand half of the unit 352 as it is being drawn down to the openings 422 and 426 would have been heated by the volatilized solvent particles and infrared generator exhaust gases entering the stream as it passes from the nozzle 382 toward the end of the left hand half of the unit 352.

The vertically extending ducts 406 and 408 are connected to inlet openings located in the same positions at the right hand half of the unit 352 as the inlet openings 422 and 426 for the ducts 402 and 404 respectively.

Referring again to FIGURE 14, in addition to supplying air to the nozzle 382, a portion of the air fed into vertically extending conduit 386 is directed through a duct 430 past a control damper 432 to a discharge opening 434 to direct a sufficient amount of air against the top of the housings of the infrared generators of the bank 391 to cooperate with the improved infrared generator construction hereinafter described to prevent their housings from overheating. This air is withdrawn through a downwardly facing inlet opening for a duct 436 communicating with a laterally extending duct 438 extending into the side of the duct 400 as is best illustrated in FIGURE 15.

The air curtain structure of unit 350 is in all material respects the same as described above in reference to unit 352 with the exception that, as in the second and third oven embodiments, one of the sections of the air curtain must be provided with a greater solvent evacuating capacity than that of the remaining sections. In this embodiment the left hand section of the second unit 352 will normally have greater solvent evacuating capacity than the sections of unit 350 or the right hand section of unit 352. This difference in capacity can normally be achieved by adjustment of dampers 370 and 372 (FIGURE 14) dampers 420 (FIGURES 13 and 15) and the adjustable size inlet opening 428. It has been found however in certain installations that adjustment of these openings and dampers does not provide sufficient differential in volatilized solvent evacuating capacity and in those installations it has been found necessary to provide larger inlet openings 422, 426 and 428 and larger exhaust ducts connected thereto in the oven section in which the maximum solvent volatilization occurs.

The distribution for the premixed gaseous fuel and air to the banks 391 of infrared generators is illustrated in detail in FIGURES 16–19. Referring to FIGURE 16, the two units 350 and 352 of the oven of FIGURES 10–15 are each provided with two banks of infrared generators 391. Each bank comprises twenty parallel longitudinally extending rows of three infrared generators 500. Each generator 500 is longitudinally elongate in construction and arranged in end to end relation with the other generators in the same row. This total of two hundred forty infrared generators is divided into six zones of generators which zones are individually supplied with premixed gaseous air and fuel from one of six air and gaseous fuel premixing blower units designated 502, 504, 506, 508, 510 and 512. Unit 512 discharges into a conduit 514 which opens into a longitudinally extending manifold 516 which discharges into transversely extending branch manifolds 518, 520 and 522 extending transversely of the generator bank 391 at the right end of FIGURE 16. As is most clearly illustrated in FIGURES 16 and 17 small tubular conduits 524 connect each of the fourteen center infrared generators 500 to the branch manifold 518 individually. The fourteen central infrared generators 500 disposed beneath branch manifold 520 are similarly individually connected to branch manifold 520 and the fourteen central infrared generators disposed beneath branch manifold 522 are individually connected to branch manifold 522. Premixing blower unit 512 thus supplies premixed gaseous fuel and air to the center forty-two infrared generators of the generator bank 391 at the right of FIGURE 16. Premixing blower units 502, 506, and 510 similarly supply premixed gaseous fuel and air to the center forty-two infrared generators of the left hand bank 391 of unit 350, the right hand bank of unit 350 and the left hand bank 391 of unit 350 respectively.

Premixing blower unit 508 discharges into a conduit 530 connected to a longitudinally extending manifold 532 which extends over the major portion of the length of the entire oven, being connected to branch manifold 534 in the left hand bank 391 of unit 350, a branch manifold 536 in the right hand bank of unit 350, a branch manifold 538 in the left hand bank of the unit 352 and to a branch manifold 540. Branch manifold 534 feeds premixed gasous fuel and air to the nine infrared generators in the three rows of the infrared generators adjacent the bottom of FIGURE 16 in the left hand bank 391 of unit 350.

The branch manifolds 536, 538 and 540 similarly feed the corresponding infrared generators 500 of the portions of oven units 350 and 352 with which they are associated. For this purpose as is clearly shown by a comparison of FIGURES 16 and 17, the branch manifold 540 discharges into three distribution pipes 542, 544, 546 to which the associated infrared generators 500 are connected by conduits 548.

Premixing blower unit 504 is connected through a conduit 550 to a longitudinally extending distribution manifold 552 discharging into branch manifolds 554, 556, 558 and 560 from which premixed gaseous fuel and air is directed to the nine infrared generators 500 in the three longitudinally extending rows of infrared generators adjacent the top of FIGURE 16 in substantially the same manner as described in reference to the lowermost three rows from the distribution manifold 532, as is clearly apparent from FIGURES 16, 17, and 18.

From the foregoing description therefore, it is apparent that the thirty-six infrared generators 500 in the three lowermost rows of infrared generators 500 as viewed in FIGURE 16 are connected to the blower unit 508, the thirty-six generators 500 in the three uppermost rows of infrared generators as viewed in FIGURE 16 are connected to the blower unit 504, and that the central forty-two infrared generators in the center fourteen rows of each bank 391 are connected bank by bank to the individual blower units 502, 506, 510 and 512 respectively. Thus separate control may be provided for the outside three rows of infrared generators at each side of the oven and individual control may be provided for the center fourteen rows in each of the four banks of infrared generators throughout the oven.

As is apparent from FIGURE 18, the sixty infrared generators in each bank are mounted within a frame structure 566 which is suspended by tie bolts 568 from the main frame structure 570 of the oven. By adjustment of the tie bolts 568, the frame 566 may be raised or lowered relative to the path of work piece movement. For this purpose, portions of the distribution conduits for the premixed gaseous fuel and air are made of flexible tubing as indicated at 572 and 574 for the interconnections between manifold 552 and branch manifold 556 and between manifold 532 and branch manifold 536 respectively.

A diagrammatic illustration of the control system for supplying premixed gaseous fuel and air to the infrared generators 500 is illustrated in FIGURE 20. The control circuit for that system is illustrated in FIGURE 19.

Referring first to FIGURE 20, gaseous fuel is supplied from a supply main 600 through a manually operated main shut off valve 602 and flows through a gas pressure regulating valve 604 and past a pressure gauge 606, a low gas pressure actuated switch LGP, through a safety latch solenoid control valve MV having contacts MV–1 and MV–2 and through a junction 610. Junction 610 is connected through a normally open vent solenoid gas pressure actuated switch HGP through a branch junction 610 when valve VV is closed gas flows past a high gas pressure actuated switch HGP through a bracnh junction 616. From junction 616, gas normally flows through a normally closed burner solenoid actuated valve BV1, when open, through a manually operated shut off valve 618, to a premixing unit 620 controlled by a control motor CM1. Air is induced from atmosphere into the premixing unit 620 through a conduit 622 past an air flow indicating switch AS2. The premixed gaseous fuel and air is discharged through a conduit 624 for distribution to the center forty-two of infrared generators 500 of one bank 391. The temperature of the generator is detected by a thermo couple 626 electrically connected to a temperature controller TC2. The presence or absence of flame at the infrared generators 500 is detected by a flame rod FR1. Control motor CM1 is normally controlled by a temperature controller TC1 which is controlled by a radiamatic work piece temperature sensing unit 628 mounted above the path of work piece movement at the discharge end of the oven to detect the temperature of the work piece 392 as it leaves the oven. A photo-switch PS located above the path of work piece movement and cooperating with a light source 630 located beneath the path of work piece movement is provided to detect the presence or absence of work pieces being fed by the conveyor.

From the junction 616, gas also flows through a normally closed burner solenoid actuated control valve BV2, when open, through a manually operated shut off valve 632 to a second premixing unit 634. Air is induced into the premixing unit 634 through a conduit 636 past an air flow detecting switch AS3. Premixing unit 634 is controlled by a controller motor CM2 which as is apparent from reference to FIGURE 19, is controlled with controller motor CM1 by the temperature controller TC1. Premixed air and gas is discharged from premixing unit 634 into a conduit 638 for distribution to the infrared generators 500 of a second of the six zones illustrated in FIGURE 16. The conduits 624 and 638 each feed one of the six zones of infrared generators illustrated in FIGURE 16. For simplicity in illustration, only two of the six distribution paths have been illustrated in FIGURE 20. A flame rod FR2 is provided to detect the presence or absense of flame in the second group of infrared generators fed by the conduit 638.

Referring now to FIGURE 19, electrical power is supplied from suitable supply mains 640, which in the illustrated embodiment provide 440 volt 3 phase 60 cycle current. Current is supplied from the mains 640 through a disconnect switch DS, through the normally open contacts M2–2 of relay M2 to the motors of premixing units 620 and 634 when the contacts M2–2 are closed, to the motors of the exhaust blowers 412 through the normally open contacts M1–3 of relay M1 when closed, and to the primary winding of transformer T which is connected to supply the control circuit. The opposite sides of the secondary winding of the transformer T are connected through fuses FU2–1 and FU2–2 to the opposite sides of the control circuit lines 642 and 644.

In order to start the operation of the oven, the start switch PB2 is closed manually. When the switch PB2 is closed, a circuit is established from line 642 through the normally closed stop switch PB1, through the now closed start switch PB2, and through the coil of relay M1 to the opposite side of the line 644. Energization of relay M1 closes the hold contacts M1–1 which shunts the start switch PB2. The pilot light PL1 is turned on when relay M1 is energized. When relay M1 is energized, the contacts M1–3 will be closed to energize the motor of the exhaust fans 412 of the oven to purge the oven of any gas or combustion products that may be in it. When the exhaust fan 412 has reached its operating speed, the air flow switch AS1 in the exhaust air stream will close. Closure of the air flow switch AS1 together with the closure of the relay contacts M1–2 upon energization of the relay M1, energizes the purge timer TR1 through its normally closed contacts TR1–1 and lights the pilot light PL2 through its normally closed contacts TR1–2. Upon elapse of predetermined time, the purge timer will actuate the contacts TR1–1, 2 and 3 to open contacts TR1–1 and TR1–2 and close contacts TR1–3 to energize relay M2. Energization of relay M2 will close its contacts M2–2 to energize the motors of the premixing units 620 and 634. When these units 620 and 634 reach their operating speeds, the air flow switches AS2 and AS3 in their inlet conduits will close. Assuming that the proper minimum gas pressure is being exerted upon the low gas pressure switch LPG to close its contacts and the normally closed high gas pressure switch HGP being connected to atmospheric pressure through valve VV is closed, switches LGP and HGP will both be closed. With these switches LGP and HGP closed, the air flow switches AS2 and AS3 closed and the contacts M2–1 of relay M2 closed, the solenoid of safety latch valve MV will be energized. Upon energization of the solenoid of the safety latch valve MV and movement of valve MV to its fully open position, a circuit will be completed through the normally open contacts MV2 to energize the solenoid of the normally open vent solenoid operated valve VV to close the fluid passage between junction 610 (FIGURE 20) and the outside vent 614. Referring again to FIGURE 19, relay 1CR is energized in parallel with the solenoid of the normally open vent solenoid valve VV. Assuming that the conveyor is running to close the conveyor interlock contacts 646, the energization of relay 1CR and the closure of its contacts 1CR–1 places the oven in condition for ignition of the infrared generators 500. This is effected by shutting the oven off-on switch SS1. Upon closure of the switch SS1, the solenoids of the normally closed burner solenoid valves BV1 and BV2 are energized to open their associated valves to permit gas to flow to the premixing units 620 and 634 respectively. The ignition timer relay TR2 and the ignition transformer IGN are connected in parallel with the solenoids BV1 and BV2 as is the work by pass miter relay TR3. The flame safeguard relays CS1 and CS2 are connected in parallel with the solenoids BV1 and BV2 and controlled by the flame rods FR1 and FR2 respectively. When the infrared generators 500 have been ignited by the spark plugs SP1 and SP2 connected to the ignition transformer IGN, the flame safeguard relays CS1 and CS2 will operate to establish a series connection from line 642, through contacts of CS1 and CS2 in series to energize control relay 2CR and the pilot light PL3 indicating that the burner is on. The energization of the relay 2CR will open its normally closed contacts 2CR–1 to de-energize the ignition timer TR2 and the ignition transformer IGN. The temperature controller TC1 is a recording temperature controller with electric position proportional control rate and automatic reset. On energization of the relay 2CR, normally closed contacts 2CR–2 open to permit the control motors CM1 and CM2, which are controlled in parallel through balancing relays 648, to move to their operating range. Control motors CM1 and CM2 are both proportional control motors. In operation the radiamatic unit sights the work piece 392 as it passes from the discharge end of the oven and positions the control motors CM1 and CM2 to maintain the desired work piece temperature by controlling the firing rate. The photoswitch PS detects the presence of work. If no work piece is being processed, the photoswitch PS, by operation of its contacts PS1, freezes the control motor CM1 and CM2 to maintain the last operating temperature condition. If the conveyor stops, the infrared generators are either shut off by the conveyor interlock switch 646 or, if desired, transferred to low fire through the operation of relays TR3 and 3CR under control of an alternative conveyor interlock switch 650. When the conveyor starts again, the burners are automatically re-ignited or reset to high fire. The temperature controller TC2 senses the temperatures of the infrared generators and if their temperature is above the predetermined operating temperature, which in the present illustrated circuit is 1600° F., the temperature controller TC2 over-rides the temperature controller TC1 and runs the control motors CM1 and CM2 back to maintain the maximum infrared generator temperature of 1600° F. or the setting of the controller TC1 whichever is the lower.

FIGURE 21 illustrates a modification of the circuit of FIGURE 19 in which a sliding contact thermo-couple 652 is utilized in place of the radiamatic unit 628 to detect the temperature of the work pieces.

FIGURE 22 illustrates a further modification of the circuit of FIGURE 19 in which a thermo-couple 654 senses the temperature of a target 656 inside the oven. A predetermined relationship is established experimentally between the work piece temperature and the target temperature. In this type of system all factors must be kept constant. If the conveyor speed or work load is changed, for example, a new relationship must be experimentally determined between the temperature of the target 656 and the work piece temperature.

*First generator embodiment*

Figure 25:
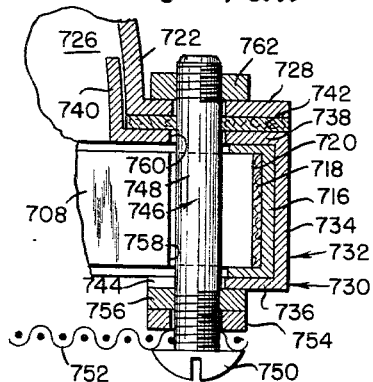
FIGURE 25 is a fragmentary sectional view taken substantially along the line 25—25 of FIGURE 23.

The detailed construction of a preferred form of gaseous fuel burning infrared generator 500 is illustrated in FIGURES 23, 24 and 25. As is therein illustrated, the radiant wall 699 of the infrared generator 500 is defined by a plurality of juxtaposed ceramic tiles 700 through 714 (FIG. 24) supported at their marginal edges with their bottom surfaces lying in a common plane by a frame 716, preferably formed of stainless steel, and of channel shape in cross section as illustrated in FIGURE 25. A continuous band of suitable high temperature thermal insulating material, such as fibrefrax, is interposed between the exterior side wall surface 720 of the ceramic tiles such as 708 and the base wall of the channel shaped frame member 716. The ceramic tiles 700–714 are preferably of the form illustrated in the aforesaid Schwank patent but may be of the construction illustrated in copending application Serial No. 43,136, filed July 15, 1960, by Konrad Bauer for Radiant Burners, which is now abandoned.

The infrared generator 500 is provided with a suitable longitudinally elongate plenum defining housing structure 722 having a central inlet opening 724 through which premixed gaseous fuel and air are introduced as previously explained and an internal longitudinally elongate chamber 726 defining a plenum. Housing 722 which is normally formed of sheet steel or as a ferro-metallic casting, and the plenum interior baffle construction is substantially identical with that disclosed in copending application Serial No. 577,762, filed April 12, 1956 by Prince et al. for Radiant Burner. Along each longitudinal edge of the open bottom of the housing 722 is a laterally extending integral flange 728, best illustrated in FIGURE 25. The radiant wall defined by the tiles 700–714 assembled within the frame 716 is mounted over the bottom opening of housing 722, the margin of which is defined by flange 728, by a plurality of mounting assemblies 730, the details of which are best illustrated in FIGURE 25. The mounting assemblies 730 each comprise a metal clip 732, formed of stainless steel having a side wall 734, a bottom wall 736, a top wall 738, and an upturned projection 740. The projection 740 extends within the plenum 726 in spaced relation to the interior of the wall of the housing 722. The top wall 738 is parallel to the bottom face of the flange 728 and is in spaced thermally isolated relationship therefrom by a continuous thermal insulating gasket 742, formed of fiberfrax or other suitable material, interposed therebetween. The walls 738, 734 and 736 define a channel closely surrounding the exterior of the channel shaped frame 716 and providing a suport therefor. The bottom wall 736 is formed with an end slot 744 which surrounds, without contact, a mounting screw 746. The threaded shank 748 of mounting screw 746 extends from its head 750, through an aperture in a large mesh screen 752, the purpose of which will be explained presently, through a spacer 754, through a nut 756 with which it is in threaded engagement, through the slot 744 in the bottom wall 736 of the bracket 732, through a substantially semi-arcuate notch defined by the co-action of corner quarter arcuate notches 758 of the tiles 700–714; through an aperture 760 in the top wall 738 of the bracket 732 in spaced relation therewith, through an aligned aperture in the gasket 742, and through an aligned aperture in the housing flange 728 into threaded engagement with a nut 762 on the top of the flange 728. By cooperative adjustment of the nuts 756 and 762 along the threaded shank 748 of the screw 746, the frame 716 can be firmly clamped between the walls 738 and 736 of the clamp bracket 732 and the bracket 732 and the frame 716 firmly secured to the flange 728 of the housing 722.

It will be noted that by this construction, the ceramic tiles 700–714 extend over the flange 728 of the housing 722 to substantially completely shield the entire housing 722, including the flange 728, from the effect of any radiant energy reflected back toward the radiant wall defined by the tiles 700–714. The tiles 700–714 are completely thermally isolated from the housing 722 and extend substantially to the marginal edge of the entire infrared generator assembly 500 so that a similar generator can be placed in juxtaposition therewith either in side by side or end to end relation, with little or no space left therebetween so that an infrared generator of this type can be ignited by flame propagation from an ignited adjacent juxtaposed generator. As is best shown in FIGURE 23, the screen 752 is a wide mesh screen disposed in parallel relationship beneath the radiant wall 699 defined by the ceramic tiles 700–714 to prevent any particles of ceramic material from dropping onto the work pieces in the event of the deterioration of the tiles after extended use. In addition, screen 752 increases the amount of radiation emitted due to the reradiation from the screen wire which reaches a higher temperature than the ceramic blocks.

Second generator embodiment

Figure 26:
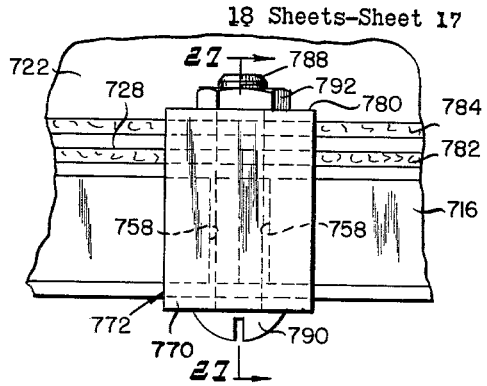
FIGURE 26 is a fragmentary view illustrating a modification of the generator of FIGURE 23.
Figure 27:
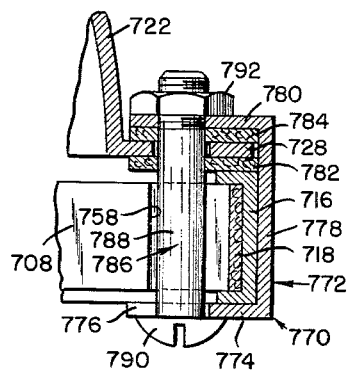
FIGURE 27 is a sectional view along the line 27—27 of FIGURE 26.

A modified mounting assembly 770 for securing the tiles 700–714, their supporting frame 716 and interposed gasket 718 to the flange 728 of the housing 722 is illustrated in FIGURES 26 and 27. In this embodiment, the frame 716 is supported by a plurality of brackets 772 each having a bottom wall 774 slotted at 776, a side wall 778, and a top wall 780 lying above the flange 728 of the housing 722. A suitable thermal insulating gasket 782 is interposed between the top of the frame 716 and the flange 728 and a further suitable thermal insulating gasket 784 is interposed between the top wall of 780 of the bracket 722 and the flange 728 of the housing 722. A mounting screw 786, provided with a threaded shank 788, extends from its head 790 through the slot 776, through the notches 758 in the tiles, through the gasket 782, the housing flange 728, through the gasket 784 and the top wall 780 of the bracket 772 and into threaded engagement with a nut 792. It will be noted that the housing flange 728 is thermally isolated from the bracket 772, from the frame 716, from the screw 786, and from the tiles 700–714. The shank 788 of the screw 786 is in spaced relation to both the tiles and the housing flange 728.

With the foregoing exceptions, the embodiment of FIGURES 26 and 27 is the same as the embodiment of FIGURES 23–25.

Third generator embodiment

Figure 28:
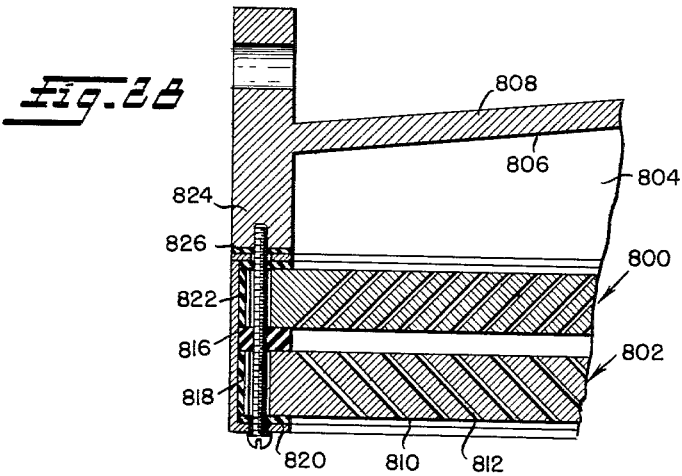
FIGURE 28 is a fragmentary longitudinal sectional view through an infrared generator constituting a further modification of the burner of FIGURE 23.

FIGURE 28 illustrates an embodiment of the invention adapted for extremely high temperature operation as in glass kilns. In this embodiment, a pair of walls 800 and 802 are mounted over the side wall opening 804 of a plenum chamber 806 of a burner housing 808, such as the housing 722 of FIGURE 23. In this embodiment, the walls 800 and 802 are both formed of ceramic tiles, wall 802, being the exterior wall, the exterior surface 810 of which will be heated to visible radiance by the combustion of gaseous fuel and air on its surface 810 and in the outlet ends of its transverse through perforations 812. The ceramic tiles which form the wall 802 may be of the type illustrated in the aforesaid Schwank patent or may be of the diagonally transversely perforated type illustrated and claimed in said co-pending application of Bauer. The tiles of walls 800 and 802 are supported in a stainless steel frame structure 816 of channel shape in cross section, being thermally insulated therefrom by suitable gaskets 818 and 820 for wall 802 and gasket 822 for wall 800. The frame 816 is thermally insulated from the flange 824 of the housing 808 by an interposed gasket 826. The size of the perforations through the inner ceramic wall 800 are preferably smaller than those of the wall 802 but, if oppositely diagonally inclined perforations are provided as indicated in FIGURE 28, may be of equal size. The spacing between the adjacent parallel surfaces of the walls 800 and 802 is preferably in the order of one-eighth inch to define a chamber therebetween. The provision of the interior wall 800 provides proper isolation of the intermixed gas and air within the plenum 806 from the effects of the reflected radiant energy upon the exterior tile of wall 802 thereby minimizing the possibility of flashback and insures complete thermal isolation of the housing 808 from any reflected radiation.

Fourth generator embodiment

FIGURE 29 illustrates a modification of the burner of FIGURES 23–25 by the substitution of a multiple ply screen assembly 830 for the ceramic tiles as the radiant wall 699 of infrared generator 500. Multiple ply screen assembly 830 comprises an inner screen 832, an outer screen 834 of substantially equal mesh to the screen 832 and an intermediate screen 836 having substantially larger apertures and heavier gauge wire than the apertures and wire of the screens 832 and 834 to maintain the screens 832 and 834 in spaced relation. In practice, screens 832 and 834 may have 40 x 40 apertures per square inch and screen 836 may have 10 x 10 apertures per square inch. The margins of the screens 832 and 834 and 836 are anchored in a metal frame structure 838 which is secured to the housing 722 by suitable attachment screws 840, thermal isolation of the multiple ply screen assembly 830 from the housing 722 being maintained by a gasket 842 and thermal isolation of the frame structure 838 from the screw 840 being maintained by tubular insulator 844 and gasket 846.

Fifth generator embodiment

FIGURE 30 illustrates an infrared generator adapted for high temperature use such as that of the embodiment of FIGURE 28 but utilizing a pair of parallel multiple ply screen assemblies 850 and 852, each of which may be of the same construction as the screen assembly 830 of FIGURE 29, and mounted in parallel relation within a channel shaped frame 854. Thermal isolation of screen assembly 850 from screen assembly 852 is maintained by the interposed gasket 856; thermal isolation of the screen assembly 850, from the frame 854 by the interposed gasket 858; and thermal isolation of the screen assembly 852, from the frame assembly 854 by the gasket 860. The frame 854 is thermally isolated from the housing 722 by a gasket 862. The frame 854 is fixed to the housing 722 by a plurality of mounting screws 864 extending as illustrated as through the top and bottom walls of the frame 854 and through the frames of the screen assemblies 850 and 852 into threaded engagement with the housing 722, thermal isolation of the assemblies 850 and 852 from the screw 864 being maintained by tubular insulators 866 and 868.

Sixth generator embodiment

FIGURE 31 illustrates a further high temperature infrared generator utilizig an interior wall 870 of the multiple ply screen type as described as in reference to FIGURE 29 and an exterior wall 872 in the form of perforated ceramic tile of the type described in the aforesaid schwank patent. The walls 870 and 872 are maintained in mutual isolation by an interposed gasket 874 and the interior wall 870 is isolated from the housing 722 by an interposed gasket 876. The walls 870 and 872 are attached to the housing 722 by screws 878 which are thermally isolated from the walls 870 and 872 by tubular insulators 880 and 882 as shown.

Seventh generator embodiment

FIGURE 32 illustrates a further high temperature embodiment of the invention which in all respects is identical to the embodiment shown in FIGURE 31 with the exception that the positions of the walls 870 and 872 have been interchanged so that the multiple ply screen wall 870 is the exterior wall which is heated to radiant temperature and the ceramic tile wall 872 is the interior wall which maintains thermal isolation between the radiant exterior wall and the plenum 726. In the embodiment of FIGURES 30, 31 and 32, as in the embodiment of FIGURE 28, the spacing between the exterior and interior walls should be in the order of one-eighth of an inch and the perforations of the interior wall should be of lesser cross section than the perforations through the exterior wall.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. A method of heat treating a work piece, comprising the steps of:
   (a) establishing from a source a beam of infrared radiation;
   (b) moving a work piece through said beam to heat said work piece; and
   (c) effecting a flow of air at high velocity between but substantially out of contact with said source and said work piece to establish an infrared radiation transparent shield between the source of the infrared radiation and the path of work piece movement and to remove volatilized substances from between said source and said work piece without cooling said source or said work piece and without penetration of said volatilized substances to the vicinity of said source by:
      (1) effecting a flow of air which is at a temperature substantially lower than the temperature of the radiant energy source between said source and said work piece and generally parallel to said work piece from one peripheral portion of said beam; and
      (2) exhausting said air and evolved substances from between said source and said work piece at an opposite peripheral portion of said beam at a greater rate than said air is supplied to maintain said flow at a high velocity and in a stream which is out of substantial contact with said source and said work piece.

2. The method as defined in claim 1, wherein:
   (a) said volatilized substances are flammable; and
   (b) said flow of air is maintained at a rate sufficiently high to dilute said volatilized substances to such an extent that the ratio of solvent to air is below that required for combustion of said volatilized substances.

3. The method as defined in claim 1, wherein:
   (a) said volatilized substances are flammable; and
   (b) said flow of air is maintained at a sufficiently high rate and a sufficiently low temperature to cool said evolved substances to a temperature below the ignition temperature thereof.

4. A method of heating a work piece on opposite sides, comprising the steps of:
   (a) establishing a pair of oppositely directed beams of infrared radiation from two spaced apart sources;
   (b) establishing a pair of spaced, parallel, high velocity air streams through said beams in a direction substantially normal to said beams at distances sufficiently far from said sources that said air streams are at least substantially out of contact with said sources by supplying air to said streams at one peripheral portion of each of said beams and exhausting said air from the opposite peripheral portion thereof at a sufficiently higher rate than the air is supplied to maintain said air streams substantially out of contact with said infrared sources; and
   (c) moving the work piece through said beams in a path between said air streams.

5. A method of heat treating a work piece, comprising the steps of:
   (a) establishing from a source having a radiant energy emitting surface a beam of infrared radiation;
   (b) effecting a flow of air at high velocity in a stream of substantially the same width as said beam of radiation generally parallel to said emitting surface but substantially out of contact with said source to establish an infrared radiation transparent shield generally parallel to the source of the infrared radiation and to remove volatilized substances from between said source and a work piece thereadjacent without cooling said source and without penetration of said volatilized substances to the vicinity of said source by:
      (1) effecting a flow of air which is a temperature substantially lower than the temperature of the radiant energy source parallel to said source from one peripheral portion of said beam; and
      (2) exhausting said air and the substances volatilized from said work piece at an opposite peripheral portion of said beam at a faster rate than said air is supplied to maintain said flow at high velocity and in a stream which is out of substantial contact with said source; and
   (c) moving said work piece through said beam of infrared radiation in a path which is generally parallel to the stream of air flowing through said beam and which is spaced from said source of infrared radiation in the direction of said stream of air, said work piece being moved in a direction which is generally perpendicular both to the direction of movement of the air stream and the beam of infrared radiation.

6. The method as defined in claim 4, wherein said air streams are established sufficiently far apart to permit said work piece to move therebetween out of substantial contact therewith.

7. Apparatus for baking a coated work piece, comprising:
   (a) a drying oven having plural sections through which coated work pieces may be moved seriatim to dry and cure the coating thereon;
   (b) means in each section including a radiant energy emitting source establishing a beam of infrared radiation intersecting the path of work piece movement therethrough; and
   (c) means in each section for evacuating therefrom solvent evolved from coated work pieces moving therethrough including means establishing a curtain of air flowing transversely through the beam of infrared radiation adjacent and substantially parallel to the path of work piece movement, but out of substantial contact with said radiant energy emitting source and sufficiently far removed from the path of work piece movement to permit movement of work pieces along said path with substantially no contact with said curtain including air supply means and exhaust blower means, said exhaust blower means having a greater capacity than said air supply means and being located at the opposite side of said beam of radiation therefrom, the solvent evacuating means in the oven section in which maximum volatilization occurs having a substantially greater solvent evacuating capacity than the evacuating means in the other of said oven sections.

8. Apparatus for heating a work piece, comprising:
(a) means including a radiant energy emitting source for establishing a beam of infrared radiation;
(b) means for moving a work piece through the beam of infrared radiation to volatilize at least one substance from the work piece; and
(c) means for establishing an infrared radiation transparent shield between the source of said radiation and the path of work piece movement to isolate the work piece from said source and for removing volatilized substances from between said source and said work piece, including:
(d) air guide structure defining at least one air inlet nozzle oriented to discharge air parallel to the path of work piece movement, said nozzle having a generally rectangular discharge opening with a width substantially greater than its depth whereby said air is caused to flow in the form of a thin curtain between said source and said work piece, and a generally rectangular outlet opening disposed in spaced relation to and on the opposite side of said beam of infrared radiation from the discharge opening of the air inlet nozzle, said outlet opening being of substantially the same width as said discharge opening and having a greater depth than the latter to accommodate expansion of the air as it flows from said discharge opening to said outlet opening;
(e) an air supply blower in fluid communication with said inlet nozzle; and
(f) an air exhaust blower in fluid communication with said outlet opening, said exhaust blower having a greater capacity than the supply blower to accommodate substances evolved from the coating on said work piece.

9. The apparatus as defined in claim 8, wherein the discharge opening of the air inlet nozzle and the outlet opening extend transversely of and are spaced longitudinally along the path of work piece movement.

10. The apparatus as defined in claim 8, wherein the discharge opening of the air inlet nozzle and the outlet opening are parallel to and located on opposite sides of the path of work piece movement.

11. Apparatus as defined in claim 8:
(a) wherein the air guide structure has a plurality of associated air inlet nozzles and air outlet openings as aforesaid; and
(b) said apparatus includes means for independently controlling the discharge of air from each of said air inlet nozzles.

12. Apparatus as defined in claim 8, wherein said shield establishing and evolved substance evacuating means comprises means including air guide structure as aforesaid on both sides of the path of work piece movement providing two independent curtains of flowing air parallel to and spaced from the path of work piece movement.

13. Apparatus as defined in claim 8, wherein the discharge opening of the air inlet nozzle is above the path of work piece movement and the air outlet opening is below the path of work piece movement.

14. Apparatus for heating a work piece, comprising:
(a) means providing a beam of infrared radiation including a plurality of combustion type infrared generators;
(b) means including air supply means and air exhaust means located at opposite sides of said beam of infrared radiation for providing a flow of air generally parallel to but substantially out of contact with the radiant surfaces of the infrared generators to establish an infrared radiation transparent shield adjacent the infrared generators and to remove volatilized substances from between said infrared generators and a work piece moving thereadjacent without cooling the radiant surfaces of said infrared generators and without penetration of said evolved substances to the vicinity of said infrared generators;
(c) said air inlet means being spaced from said infrared generators in the direction of the path of work piece movement and extending in a direction substantially parallel thereto for a sufficient distance to substantially span said beam of infrared radiation, said air inlet means including at least one opening for discharging air generally normal to both the path of work piece movement and the beam of infrared radiation;
(d) said exhaust means including an exhaust plenum having an opening spanning said beam of infrared radiation at the side thereof at which said plenum is located, said plenum being spaced between said infrared generators and the path of work piece movement, and exhaust blower means having a capacity sufficiently higher than that of said inlet means to exhaust the air discharged from said inlet means and the substances volatilized from the work piece into the exhaust plenum at a rate which will maintain said air and the evolved volatile substances out of substantial contact with said infrared generators; and
(e) means for moving the work piece through the beam of infrared radiation to heat the work piece in a path which is generally parallel to the stream of air flowing through said beam and spaced from said source of infrared radiation in the direction of said stream of air and which is generally perpendicular both to the direction of movement of the air stream and the beam of infrared radiation.

15. The apparatus defined in claim 14, wherein said inlet and outlet openings are arranged in direct alignment so that air discharged from said outlet opening flows directly toward said inlet opening.

16. Apparatus for heating a work piece on opposite sides thereof, comprising:
(a) means including two spaced apart sources providing a pair of oppositely directed beams of infrared radiation; and
(b) means establishing a pair of spaced, parallel, high velocity air streams through said beams in directions substantially normal to said beams at distances sufficiently far from said sources that said streams are at least substantially out of contact with said sources and sufficiently far apart to permit passage of a work piece therebetween and substantially out of contact therewith, said last-named means including air supply means at one peripheral portion of each of said beams and exhaust means at the opposite peripheral portion of each of said beams, said exhaust means having a sufficiently higher capacity than said air supply means to maintain said air streams substantially out of contact with said infrared radiation sources.

17. Apparatus for heat treating work pieces, comprising:
(a) parallel, spaced apart, horizontally extending rows of vertically oriented infrared generators for establishing a zone of infrared radiation;
(b) a conveyor having support means upon which the work pieces are adapted to be suspended for moving the work pieces between said rows of infrared generators through said radiant energy zone; and
(c) means for establishing an infrared radiation transparent shield between the work pieces and each of said rows of infrared generators to isolate the work pieces from the infrared generators and to remove volatilized solvent from between said work pieces and said rows of infrared generators without cooling said generators or said work pieces including means for effecting a flow of air between but substantially out of contact with said work pieces and said rows of infrared generators comprising:
(d) a pair of inlet nozzles substantially equal in width to the length of the rows of infrared generators adjacent one lateral edge of the rows of infrared generators, one of said nozzles being in a location between the path of work piece movement and each of said rows of infrared generators;
(e) exhaust duct means having inlets aligned with said nozzles adjacent the opposite edge of the infrared generators;
(f) first blower means for supplying air to and discharging it through said nozzles; and
(g) second blower means for inducing the air into said inlets and discharging it through said exhaust duct means.

References Cited by the Examiner
UNITED STATES PATENTS

| | | | |
|---|---|---|---|
| 1,513,161 | 10/1924 | Darrah | 34—39 X |
| 1,677,156 | 7/1928 | Vaughn | 158—99 |
| 2,012,115 | 8/1935 | Woodruff | 34—156 |
| 2,022,593 | 11/1935 | Fuykers | 34—160 |
| 2,101,335 | 12/1937 | Jennings et al. | 34—18 |
| 2,194,208 | 3/1940 | Moran | 158—99 |
| 2,204,802 | 6/1940 | Gessler. | |
| 2,220,928 | 11/1940 | Kienle et al. | 34—4 |
| 2,236,754 | 4/1941 | Gurwick | 34—41 |
| 2,266,392 | 12/1941 | Durant et al. | |
| 2,308,239 | 1/1943 | Bell | 34—41 |
| 2,405,191 | 8/1946 | Davis | 34—1 |
| 2,428,090 | 9/1947 | Naeher et al. | 34—12 |
| 2,518,740 | 8/1950 | Albright | 34—24 |
| 2,545,450 | 3/1951 | Dalton et al. | 117—93.31 |
| 2,559,713 | 7/1951 | Dunski, et al. | 34—18 |
| 2,817,506 | 12/1957 | Albright | 263—8 |
| 2,851,786 | 9/1958 | Scherer | 34—4 |
| 2,889,806 | 6/1959 | Conant | 118—643 |
| 2,908,590 | 10/1959 | Norris | 117—64 |
| 2,950,098 | 8/1960 | Ruff | 263—8 |
| 3,062,520 | 11/1962 | Frey et al. | 34—216 |

WILLIAM F. O'DEA, *Primary Examiner.*

RICHARD D. NEVIUS, NORMAN YUDKOFF,
*Examiners.*